June 25, 1968     H. KUMMERMAN ET AL     3,389,739
CLOSING DEVICE FOR HATCH COVERS AND THE LIKE
Filed Feb. 20, 1964     16 Sheets-Sheet 1
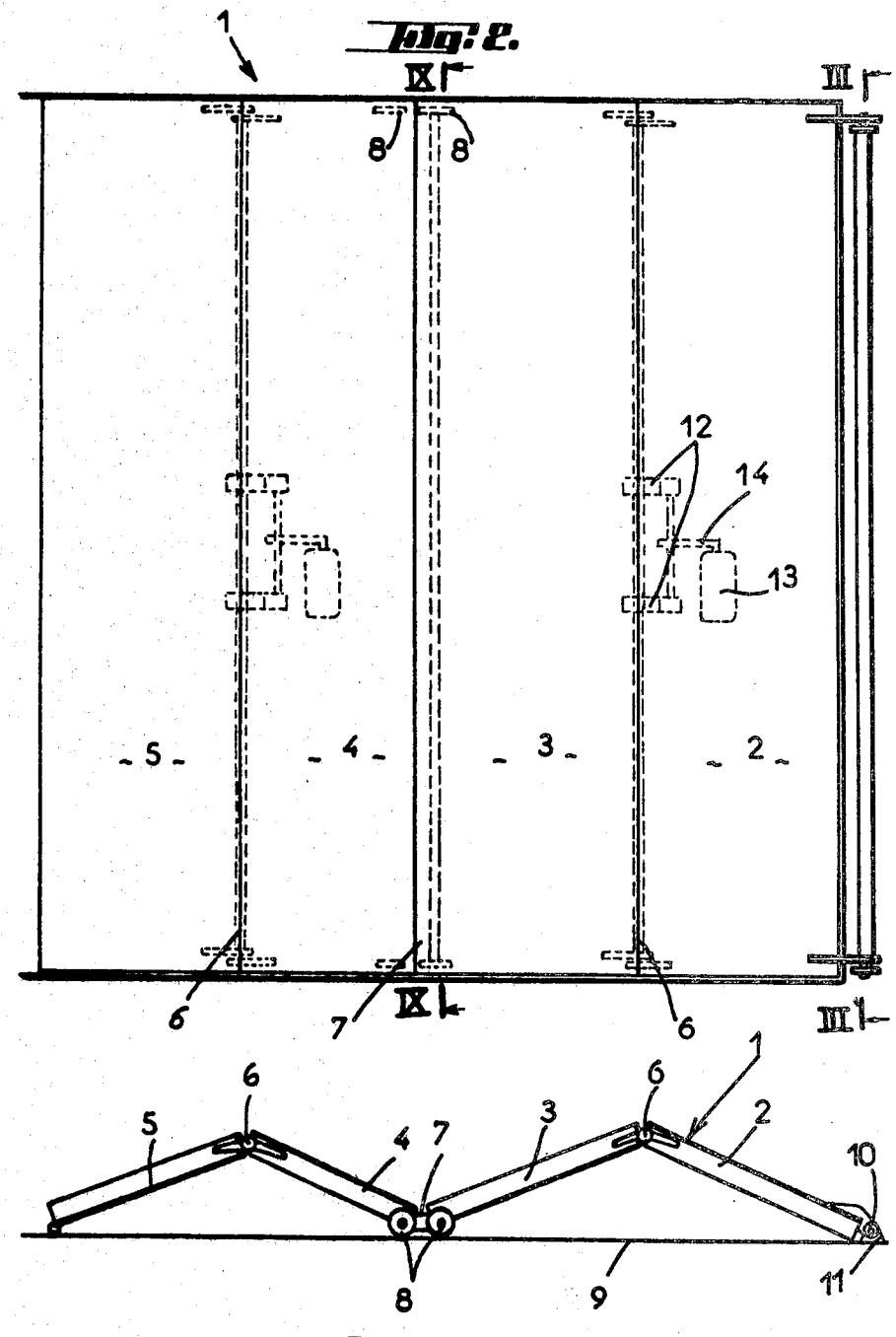
INVENTORS
HENRI KUMMERMAN
URBAN JOSEPH BEAS
BY
Kenyon & Kenyon
ATTORNEYS

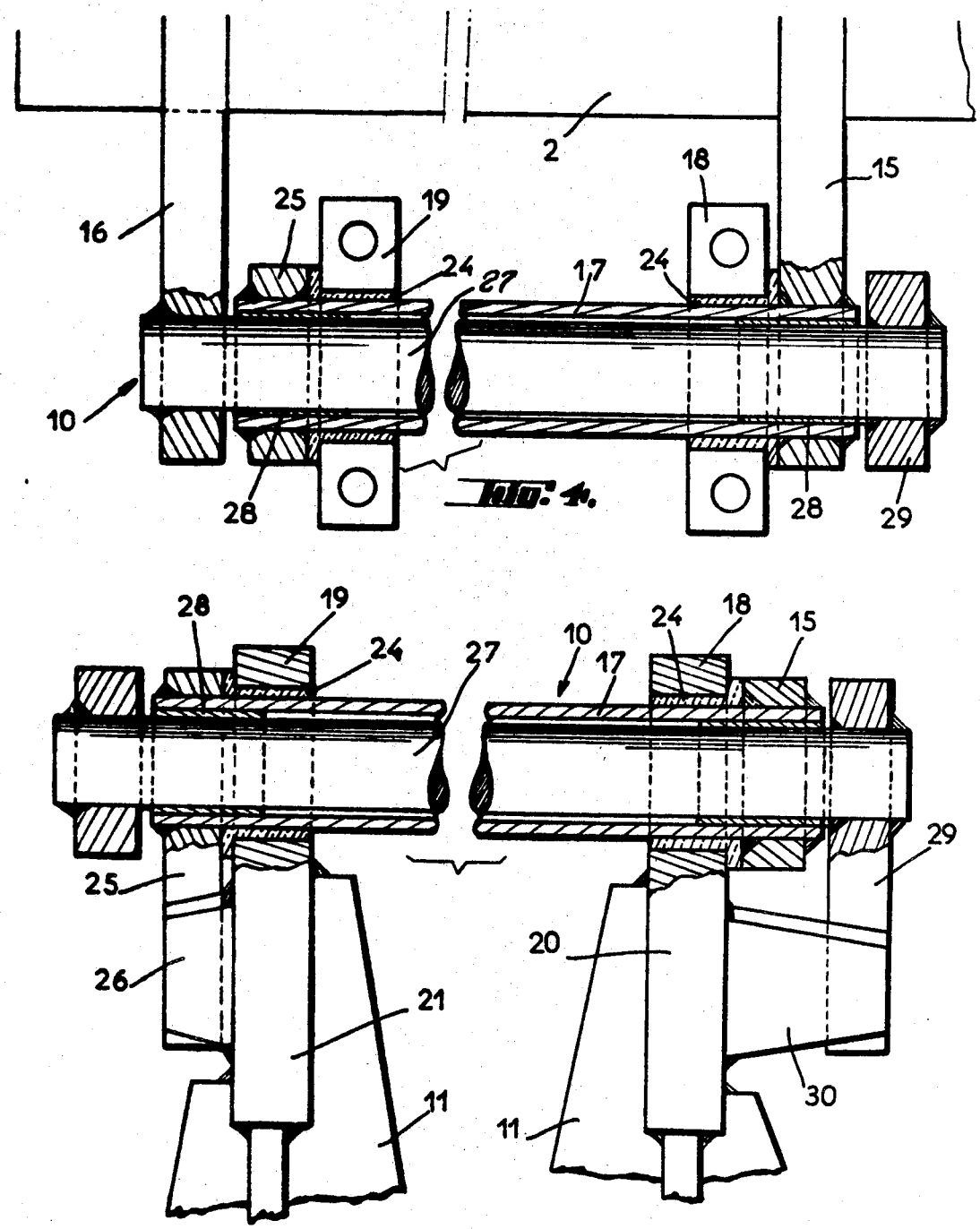

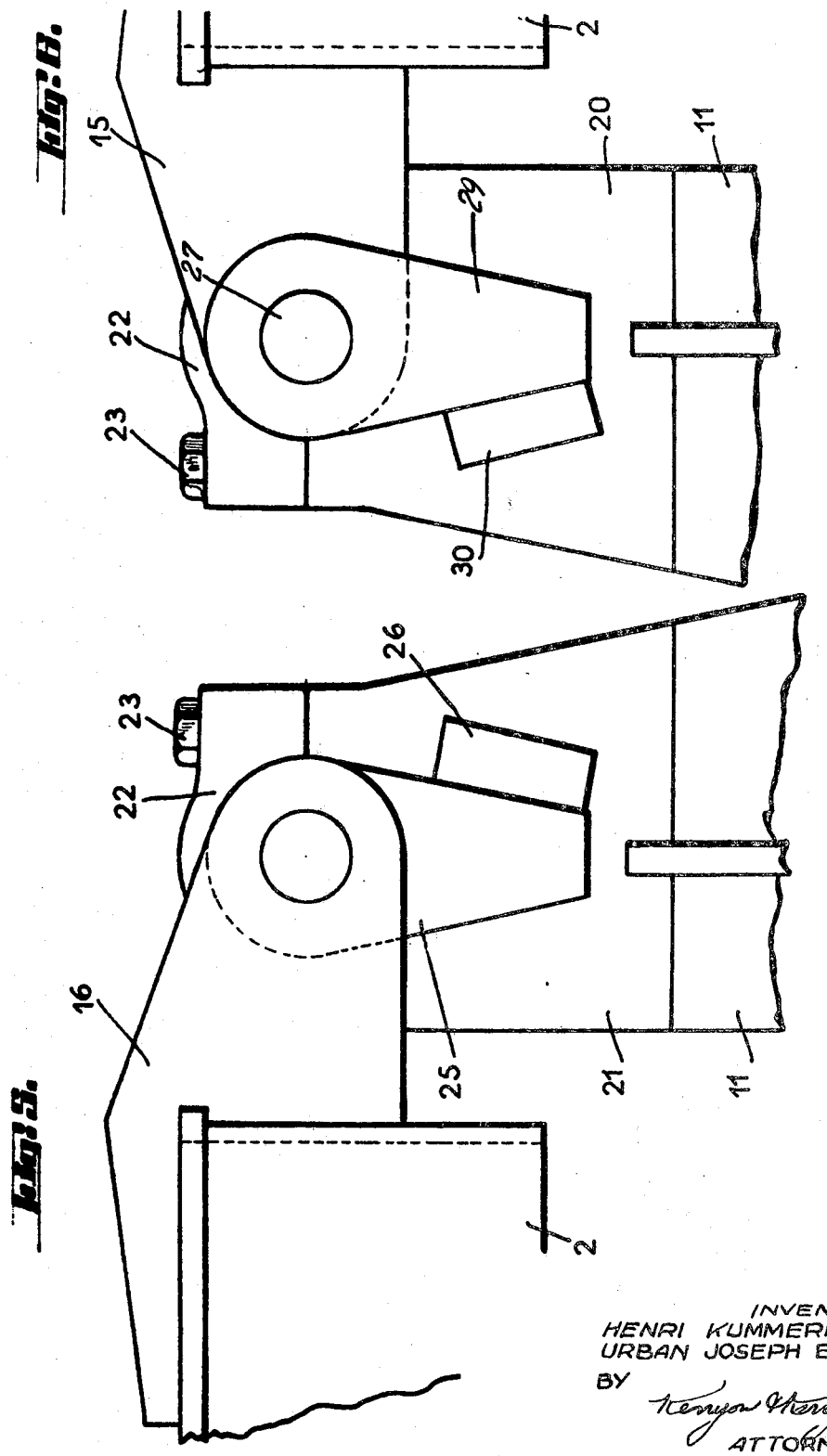

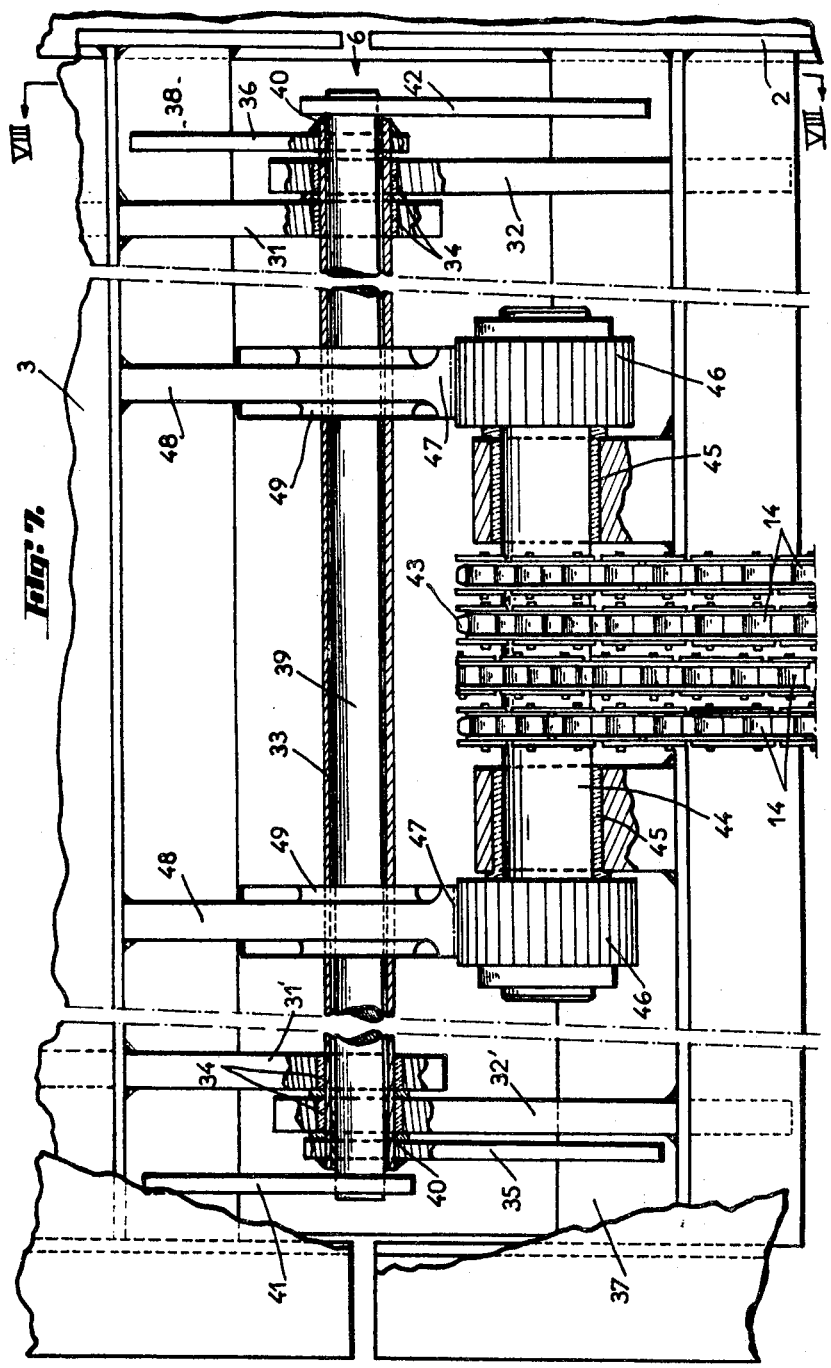

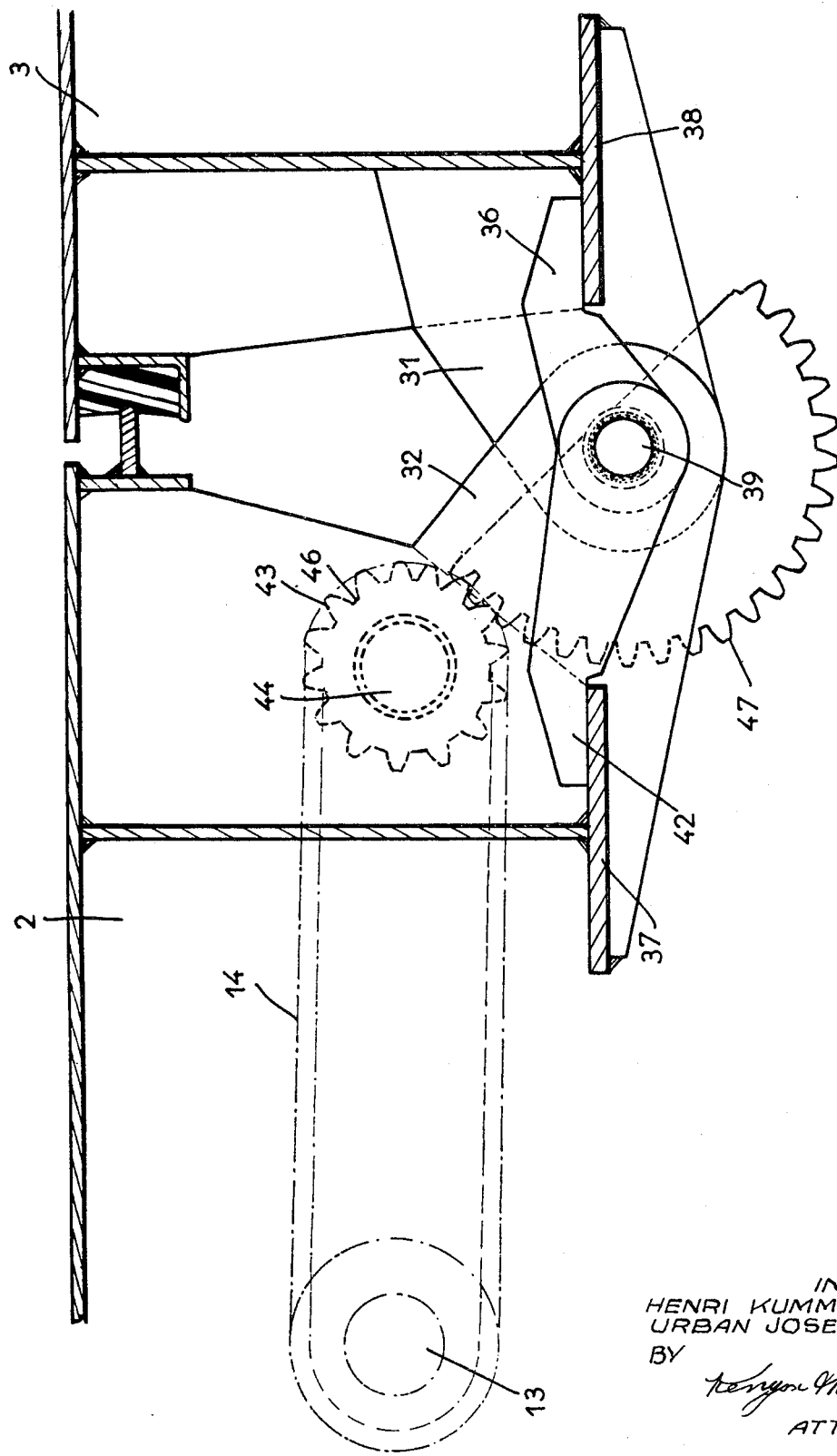

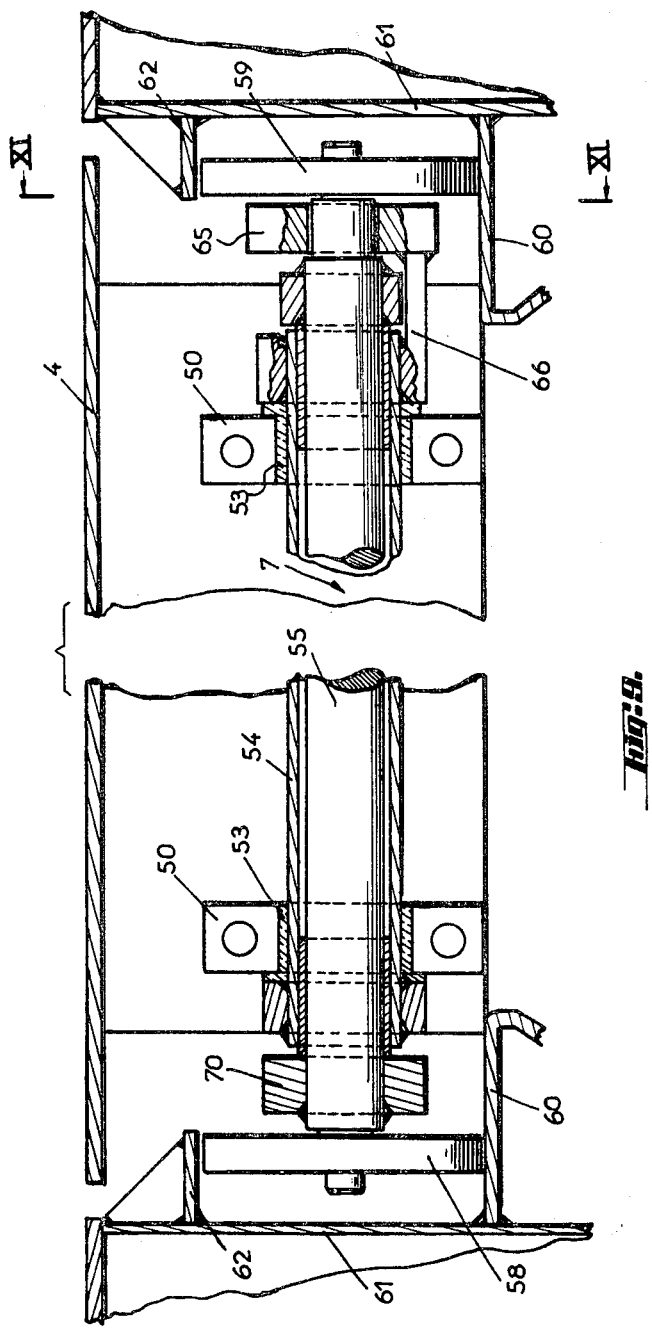

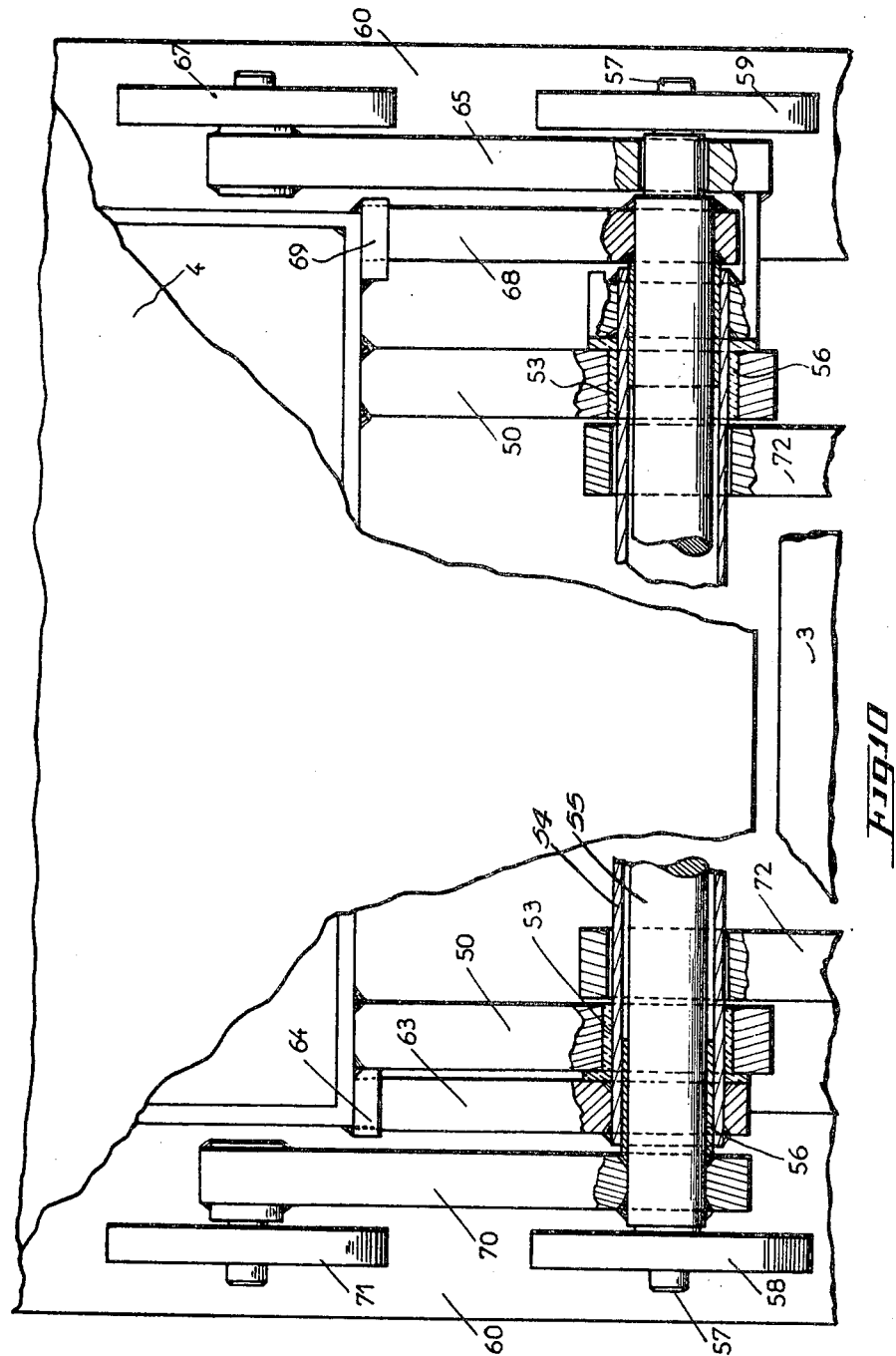

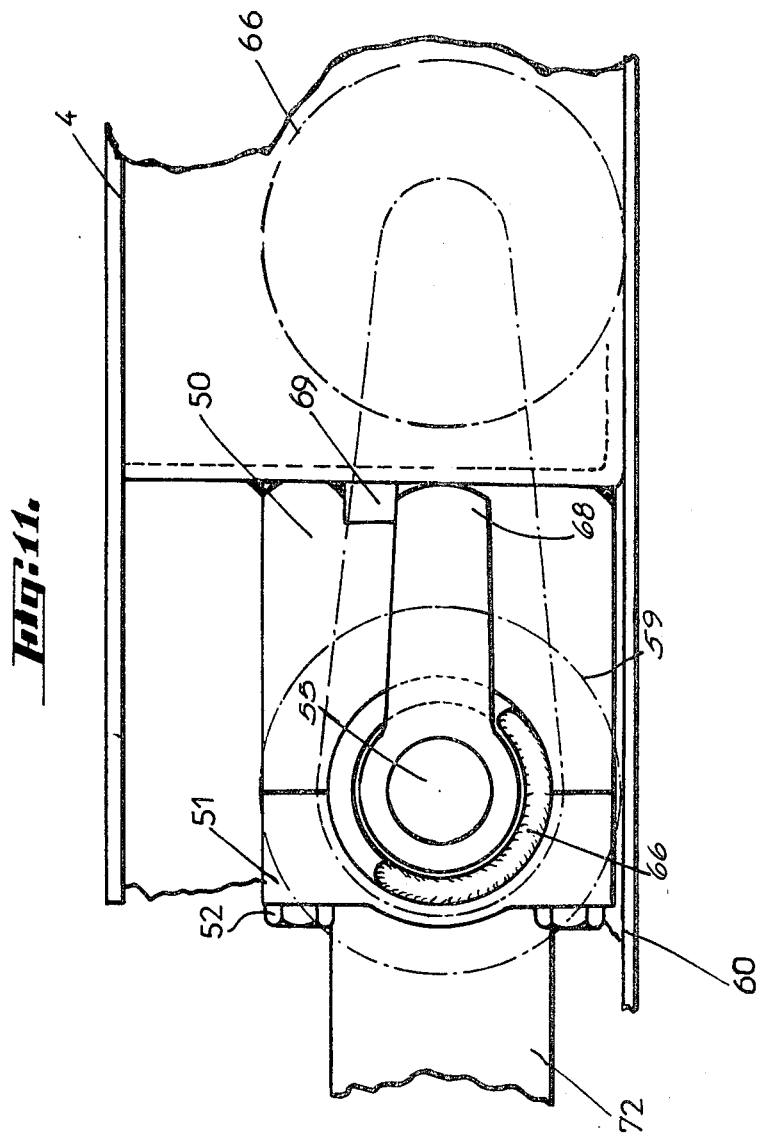

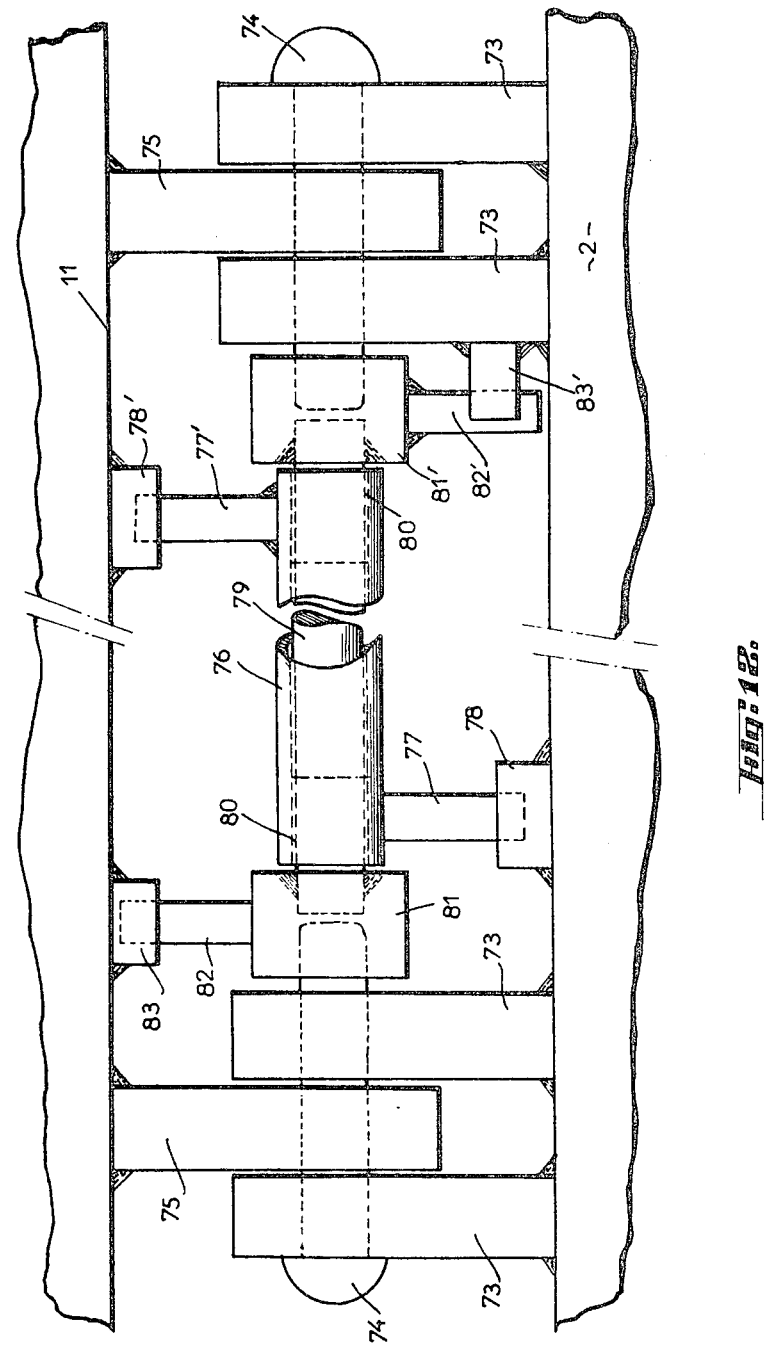

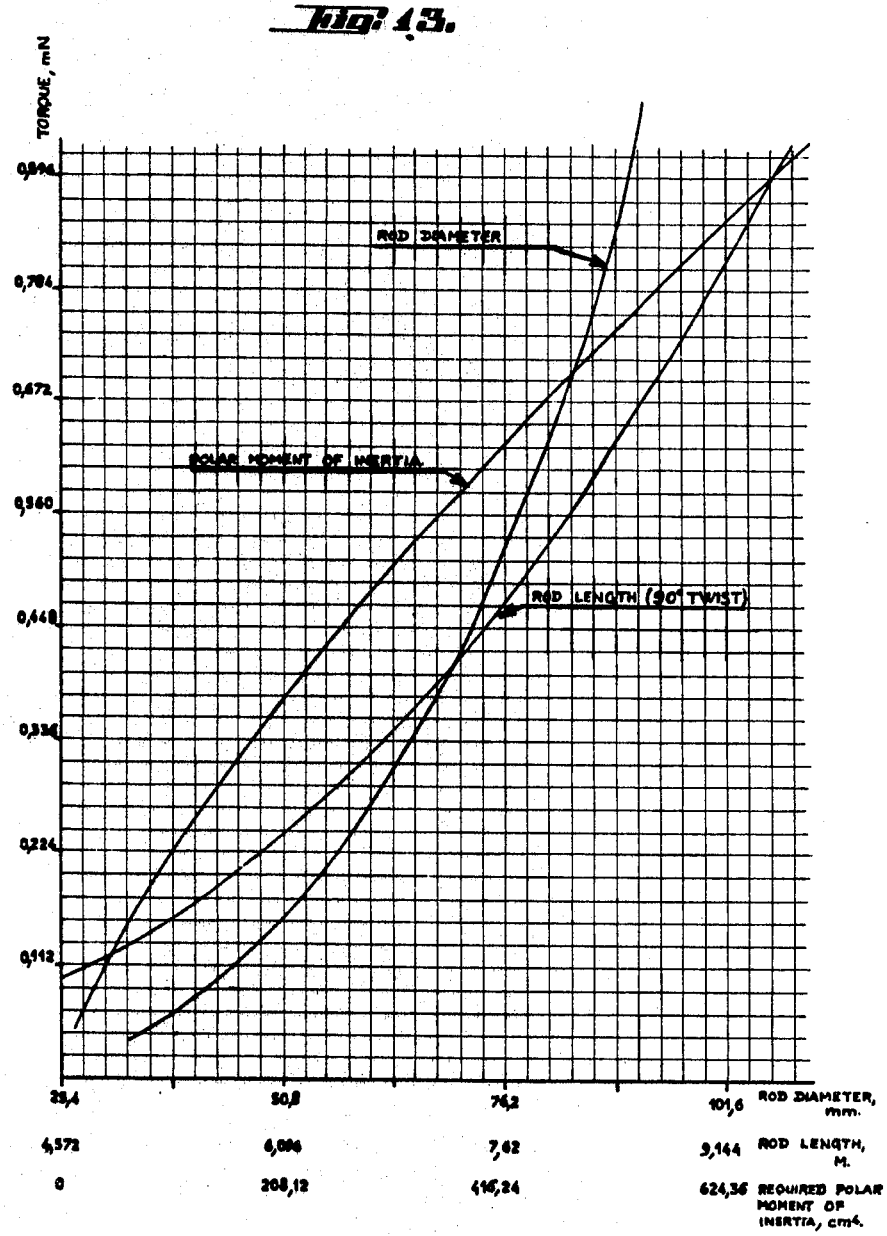

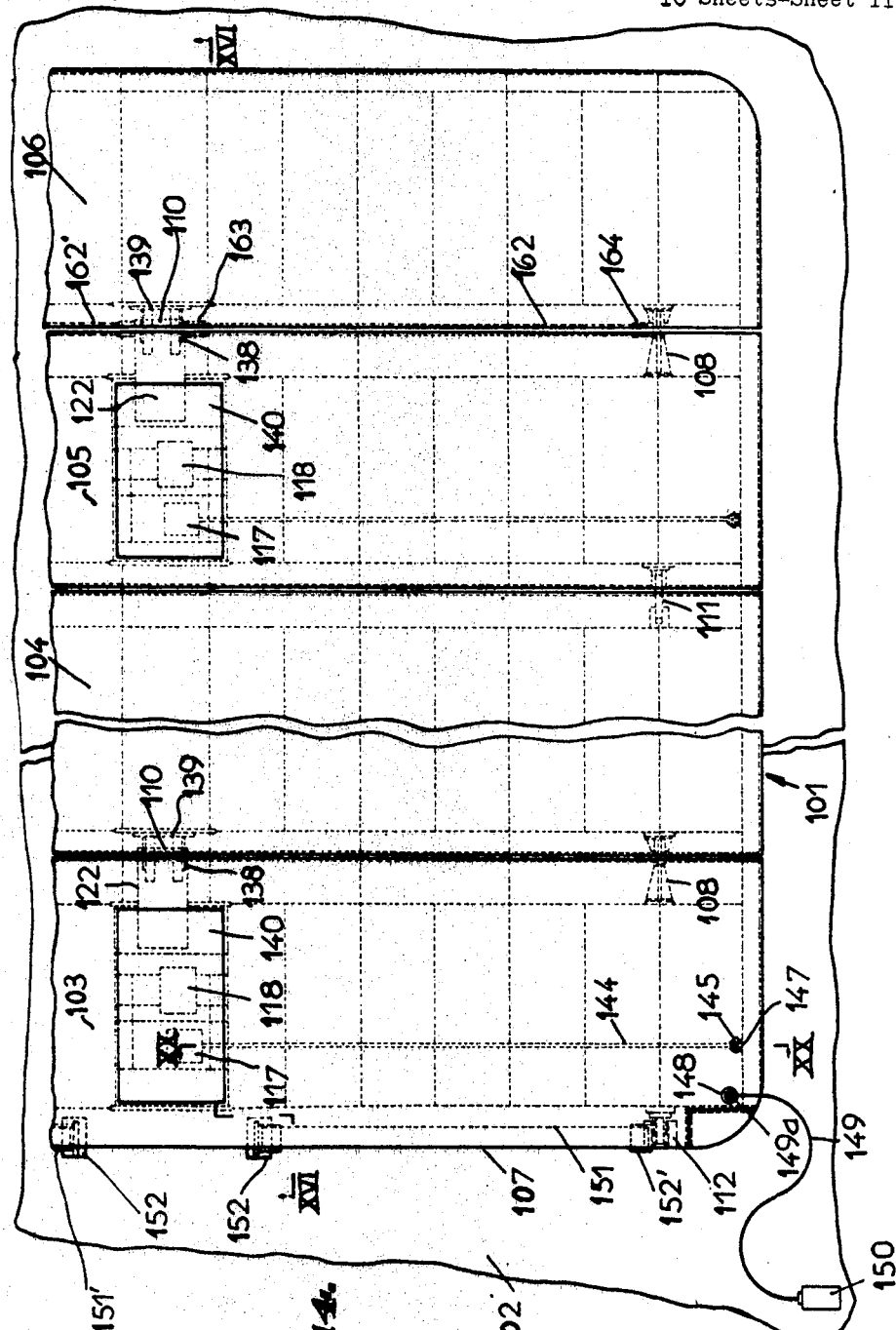

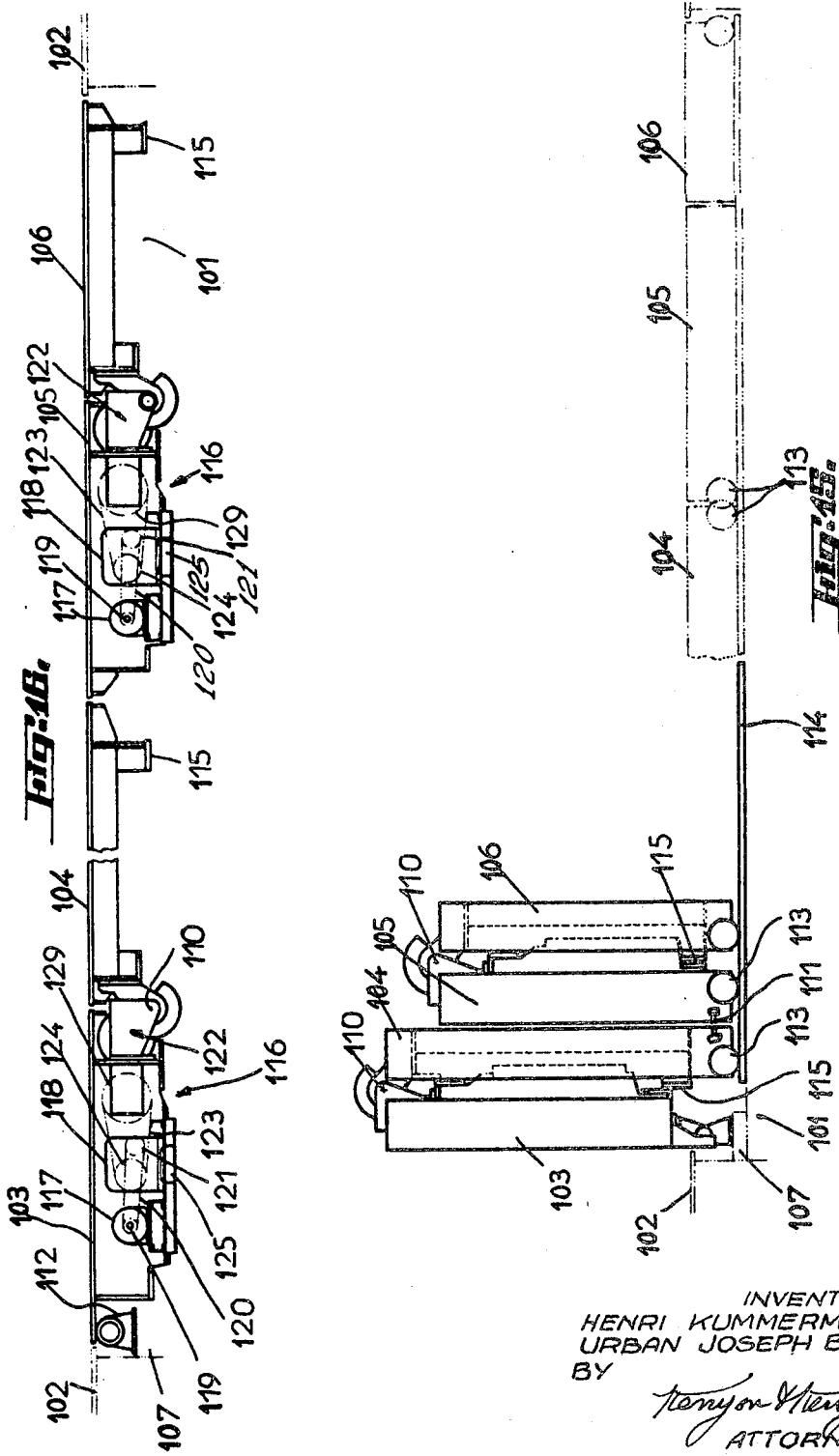

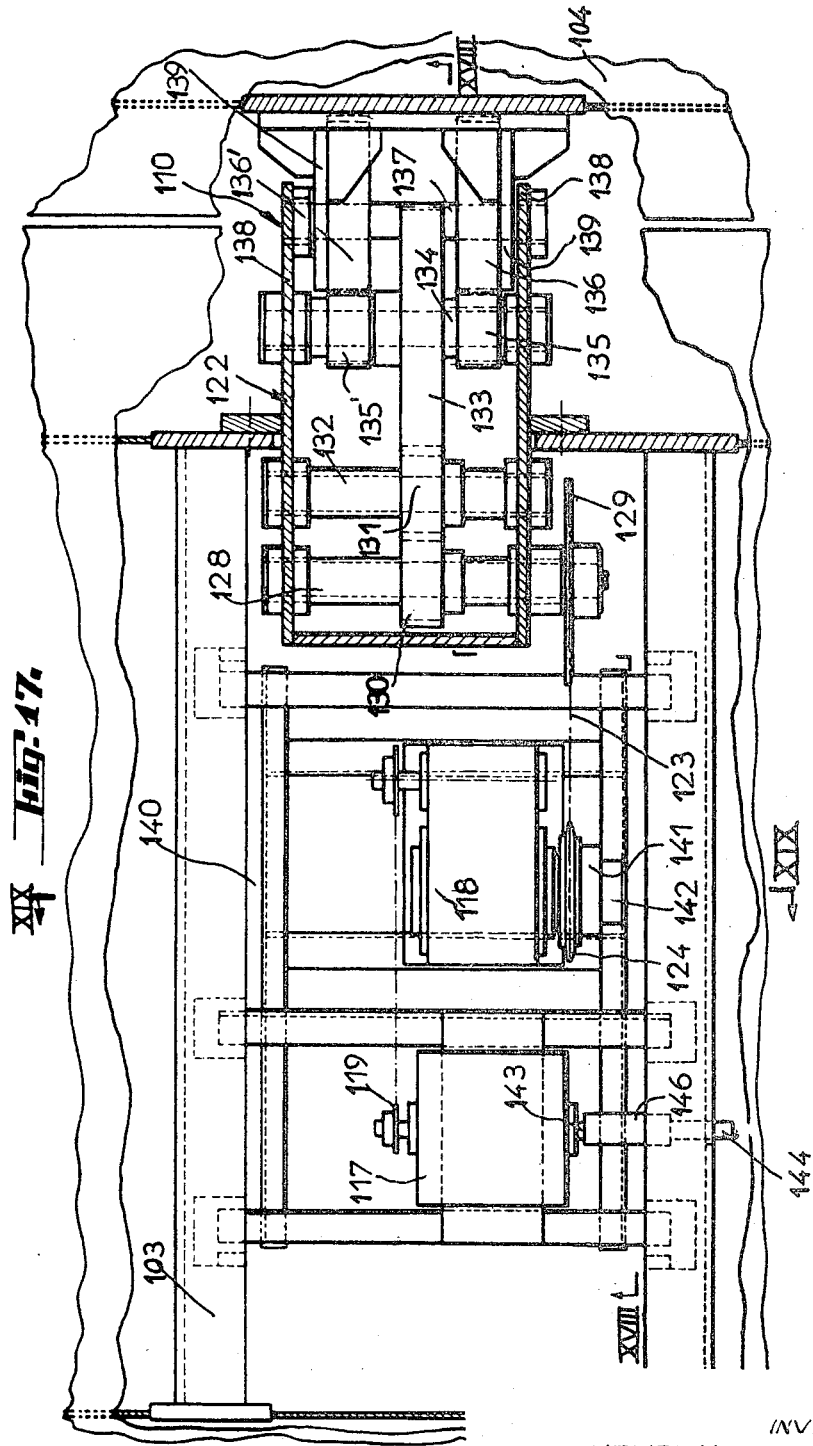

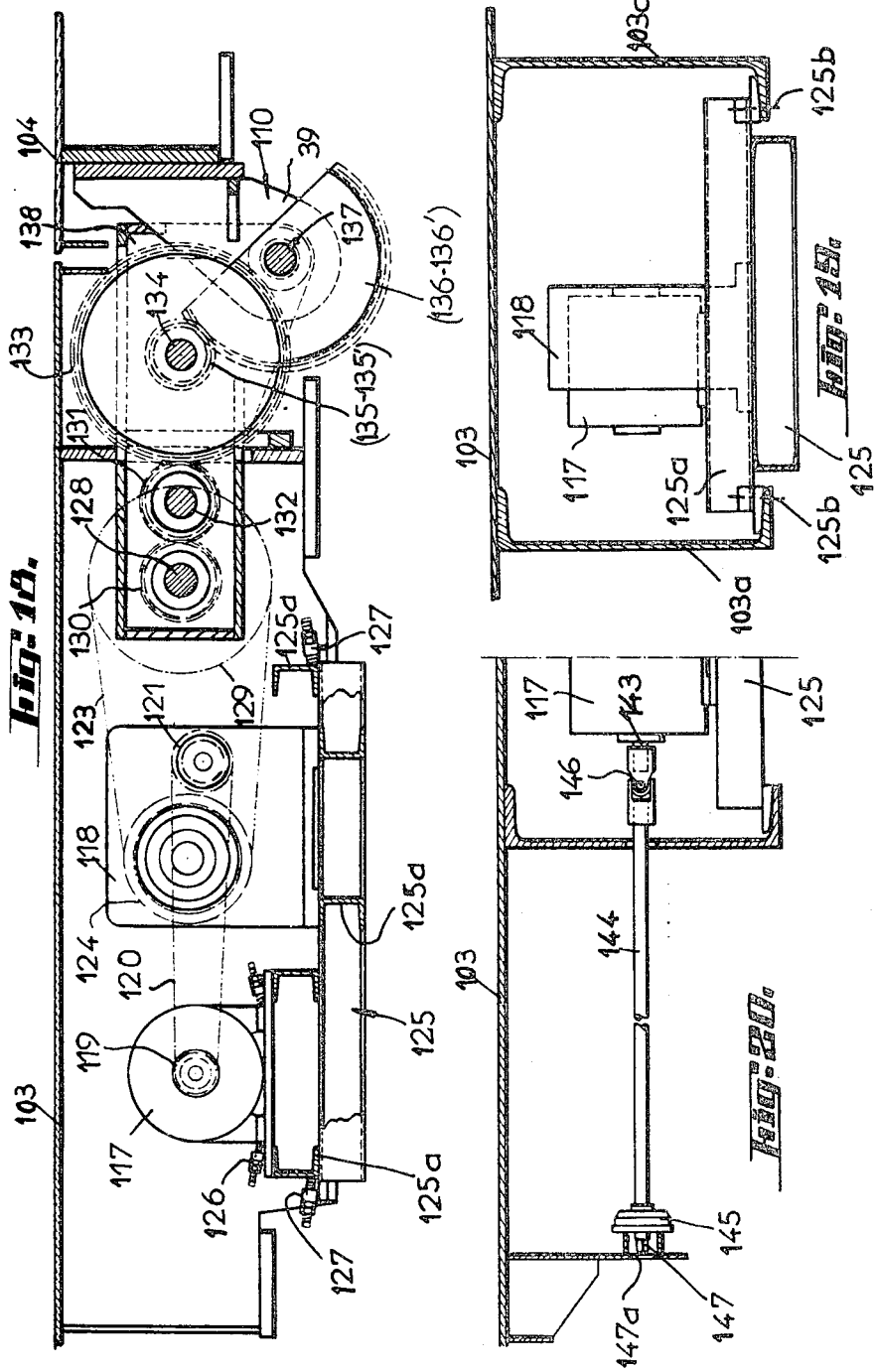

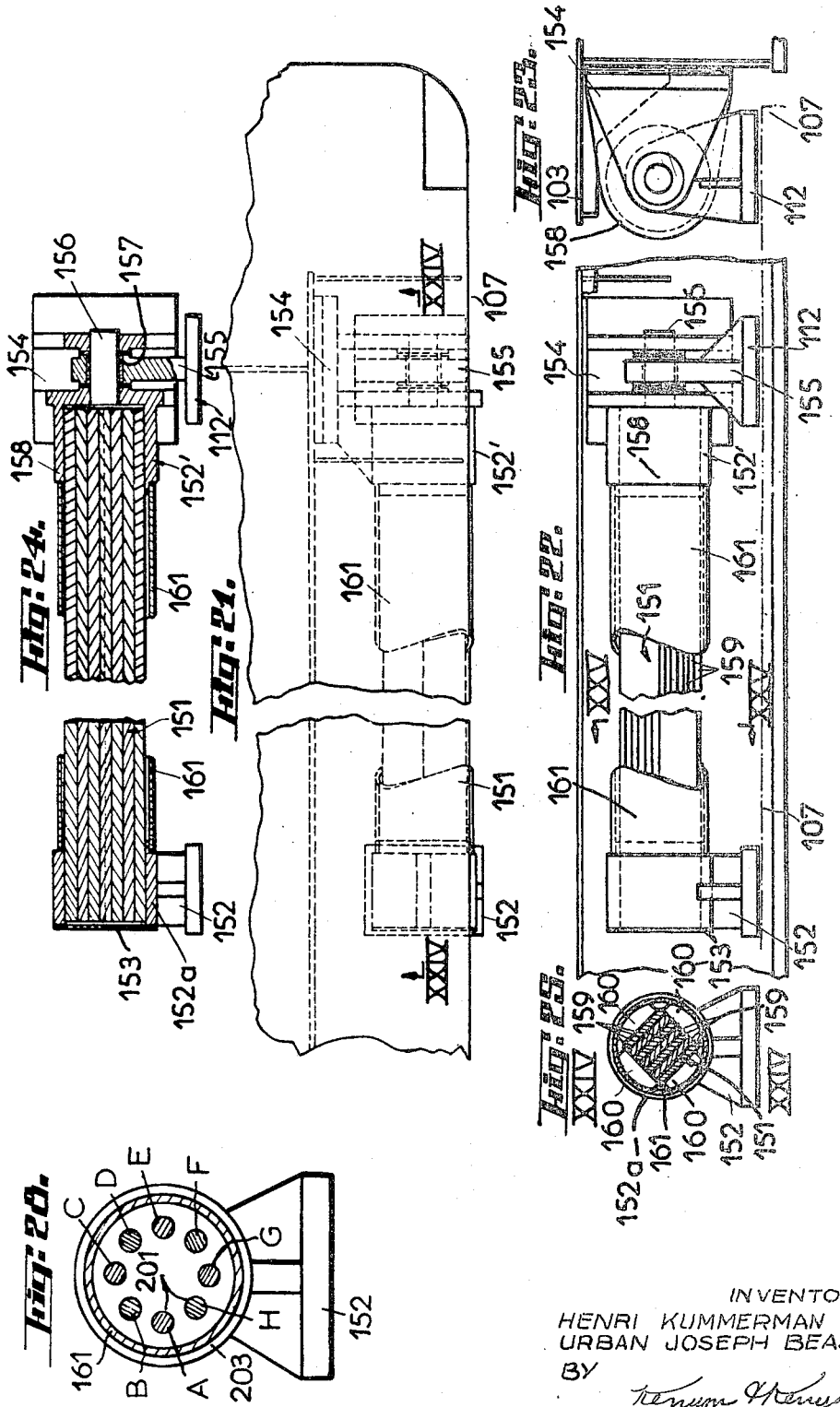

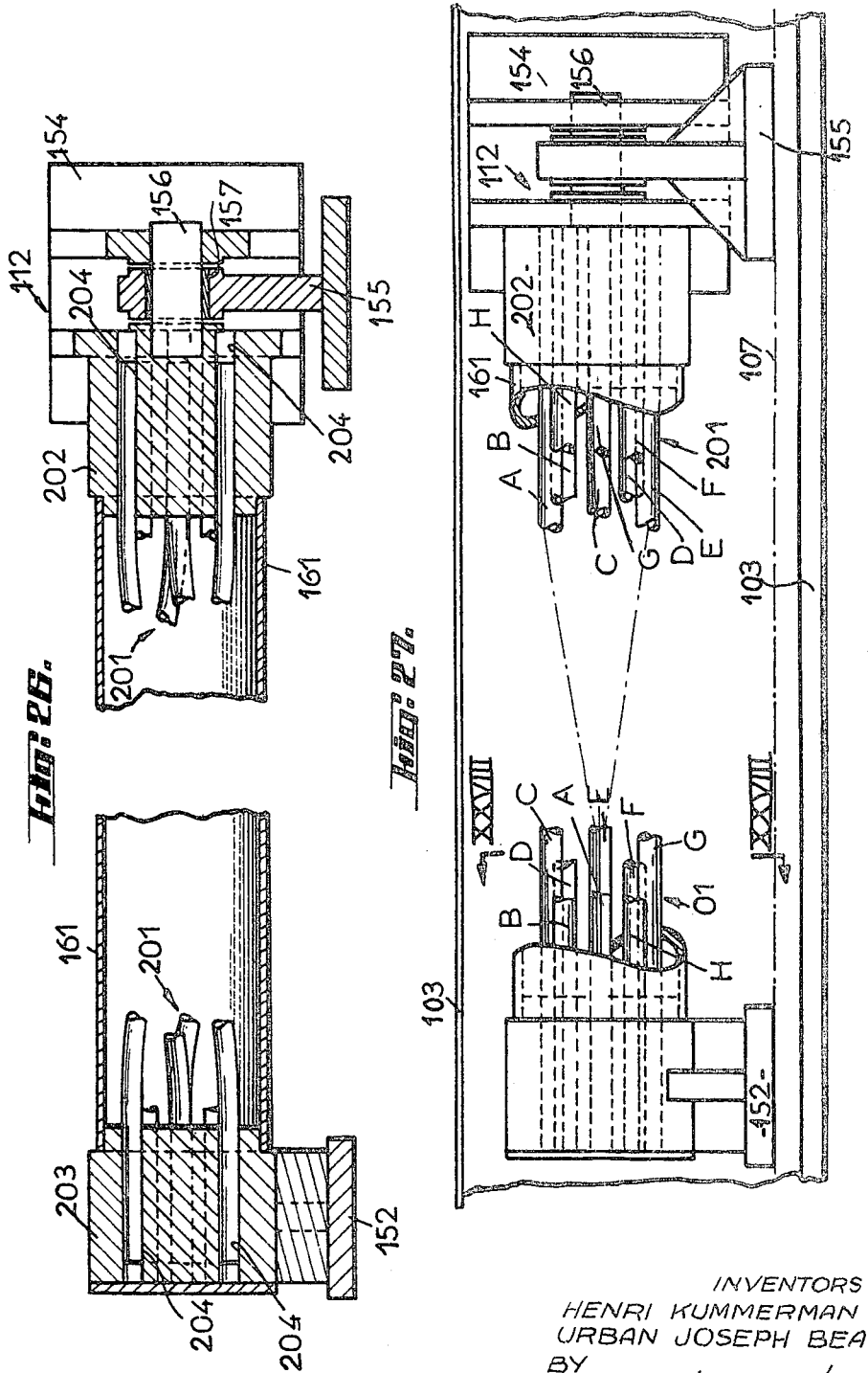

United States Patent Office 3,389,739
Patented June 25, 1968

3,389,739
CLOSING DEVICE FOR HATCH COVERS
AND THE LIKE
Henri Kummerman, Paris, France, and Urban Joseph
Beas, Scotch Plains, N.J., assignors to MacGregor
& Company (Naval Architects) Ltd., Monkseaton,
Northumberland, England
Filed Feb. 20, 1964, Ser. No. 346,279
Claims priority, application France, Mar. 1, 1963,
926,518; June 19, 1963, 938,666; Jan. 28, 1964,
961,811
32 Claims. (Cl. 160—188)

This invention is concerned primarily with an energy accumulator device for assisting the relative rotation of a hinged connection between the pair of elements of a hinged interconnected system, and also with the hingedly interconnected systems or assemblies themselves equipped with this device, notably the applications of this device to closing hinged panels or lids such as hinged hatchway panels of the folding or like type.

Devices for accumulating potential mechanical energy are already known which are associated with hinge or like means interconnecting two sections, members or structures of which at least one is angularly movable in relation to the other between two end positions. A device of this character which operates in conjunction with the hinge means permits a servo-action control of the movement of relative rotation of the hinged elements in at least one direction of rotation during at least one fraction of the movement performed by one of the aforesaid elements in relation to the other. As a rule, this energy accumulator device consists of an elastically deformable solid system such as a spring or the like of which the energy storage capacity is a function of the amplitude of its deformation. This spring is connected to the hinge means assembling the two elements of the hinged structure, of which at least one is movable in relation to the other, said spring being also adapted to be set or stressed during the movement of said movable element in one direction in order to store mechanical energy in potential form during at least one portion of this movement, this stored energy being restituted at least partially during the forced or controlled movement in the opposie direction in the form of stress assisting in the performance of said controlled movement.

Among the great number of possible applications of energy accumulator devices of this type are more particularly the assistance in the controlled movements of closing panels of ship's hatchways and the like, as well as closing lids and panels of rolling vehicles and miscellaneous buildings. In hatchway closing systems consisting either of at least one panel hingedly mounted along one edge of the hatchway so as to be adapted to be open by lifting at least up to the vertical position and closed by lowering to the horizontal position, or of a plurality of successive panel sections hingedly interconnected to constitute an accordion-like row with the endmost or first panel section hinged on the edge of the hatchway so that the hatchway may be open by folding said panel sections against each other in succession, energy accumulator devices have notably been devised which consist of at least one and preferably two torsion-bar springs of substantially rectilinear or like configuration, disposed for example coaxially to the hinge axis of the hinge means connecting the aforesaid endmost of first panel section to the edge of said hatchway, said hinged connection comprising as a rule two coaxial hinges having each a torsion bar associated therewith, said torsion bar being for example but not compulsorily coaxial to said common axis of rotation of the hinge means. Each torsion bar has one end solid with a cross arm or lever bearing preferably unilaterally against the hatchway panel in the direction of rotation causing the opening or lifting thereof. With this arrangement considerable savings can be made in the power rating of the control or power units and apparatus for operating the hatchway panels, which consist as a rule of mechanically, hydraulically, pneumatically or electrically-operated cylinders or the like, or of winches, pulley blocks, derrick masts or the like.

In fact, experience teaches that the opening of these hinged hatchway panels from their horizontal, closed or flat-spread position required, at least during the initial part of the movement due notably to the adherence or resistance to separation of sealing gaskets, the application of a very considerable lifting force or torque in comparison with those which are subsequently necessary for completing the movements of these panels or panel sections to their stowing position, for instance the vertical position, to one end of the hatchway. This leads to the use of servo-motors or like control means adapted to deliver a driving power considerably greater than that required during the major portion of the opening movement, since this power must on the one hand overcome the resistance produced by the weight of the panels or panel sections during the lifting or opening operation and on the other hand exert a braking effect during the panel closing, lowering or unfolding operation, so that the lifting means or devices utilized operate during the last portion of the opening movement with only one fraction of their rated power, and eventually these servo-motors or like control means are overpowered and cumbersome.

By the known use of the aforesaid torsion bars the potential energy acquired by the hatchway panels in their open position due to the raised position of their centre of gravity can be transferred and stored in said torsion bars during the lowering of said panels or panel sections to their closed position, with the dual advantage of braking this downward movement while relieving inasmuch the operating apparatus, on the one hand, and providing during the panel lifting or opening movement a complementary thrust or torque exerted in the panel-lifting direction as a consequence of the restitution of the potential energy thus stored by torsion, this energy adding itself to the lifting force exerted by the operating apparatus or motors, so that these apparatus or motors can be designed with a lower power rating, that is, just sufficient for subsequently completing the movement of the hatchway panels to their vertical or stowing position. It is believed that from 70% to 80% of the actual power output necessary for opening the hatchway panels by using control apparatus without energy accumulation are saved by using the spring-type energy accumulator device.

These known energy accumulator devices, applied notably to hatchway panels of the type comprising a plurality of hingedly interconnected panel sections adapted to be folded in an accordion-like fashion, have been associated more particularly with the hinged mounting of the endmost panel section of the hatchway panel assembly on the adjacent end edge of the hatchway, and also with an intermediate hinged connection disposed between two adjacent panel sections adapted to be raised to their uppermost position during the hatchway panel opening movement. As a rule, these known energy accumulator devices constituted an integral part of the panel section structure and were generally objected to as too cumbersome. Moreover, these auxiliary lifting devices were mounted generally as a permanent fixture so that in case of failure or damage their convenient and quick replacement was difficult and most likely to involve a faulty operation or even a complete standstill of the hatchway panel system.

It is the essential object of the present invention to eliminate these various drawbacks of known constructions by providing notably a somewhat self-operating or independent energy accumulator device constituting a plurality or accessory assemblies easily adaptable to existing hinge systems and essentially detachable or easily removable to facilitate their maintenance, replacement and repair.

The device according to this invention is remarkable notably in that at least one of the torsion bars in the aforesaid pair of torsion bars is tubular while the other bar is rotatably mounted and extends substantially coaxially within the tubular bar, the two torsion bars of the device being attached respectively at or about their opposite ends to transverse arms, levers or like members connected to said two relatively movable structures respectively, at least in an endmost position thereof and at least during the torsion phase or twisted condition of said bars.

According to another feature characterizing this invention the aforesaid torsion bar assembly is preferably detachable and at least one of said arms or the like attached to each bar is in unilateral and at least temporary contact with one of said structures.

This invention is also concerned with movable closing systems for hatchway panels and like access aperture on board ships, on rolling vehicles, in buildings and fixed constructions, these systems consisting of one or a plurality of hingedly interconnected folding panels of which an endmost panel is pivoted on one end edge of the hatchway or like aperture, said panels being equipped with energy accumulator devices of the type broadly set forth hereinabove, arranged and mounted in a manner already known per se so that said torsion bars are stressed automatically under the weight of said panels during at least the last fraction of their closing movement.

Finally, the invention concerns, more particularly, an automatic device for closing a hatchway or the like, of the type comprising at least one row of the aforesaid movable successive adjacent hingedly interconnected panels, for example an even number of such panels, folded in zigzag to a vertical position near an end edge of the hatchway, the two panels of each separate pair of panels being interconnected, along their common lifting joint, by means of at least one active or power-driven gearing, associated preferably with an articulation to provide a gear hinge or the like, actuated by servo-action control means incorporated with their transmission means in one of said panels of each pair. This hinge means with built-in gearing comprises as a rule at least one pair of conjugate gear members in constant meshing engagement of which one consisting of a toothed wheel or a worm or a toothed sector is rotatably driven and mounted on the panel equipped with said control servo-motor means, the other gear member, consisting of a toothed wheel, sector or the like being rigid with the other panel so as to be fixed in relation thereto and substantially coaxial to the hinge axis.

The hinged connection between the endmost edge of said hatchway and the first panel of said row, as well as preferably at least some of the aforesaid lifting intermediate hinged connections, are equipped with a mechanical energy accumulator device incorporating torsion springs and adapted to assist the relative rotation occurring during the upward movement of the hinge connection considered in particular, the potential energy being stored automatically under the influence of the inherent weight of the panels, during the downward movement of said hinged connection which corresponds to the closing or spreading movement of said panels.

This specific form of embodiment of this invention comprises notably control means characterized by a practically complete reliability in operation, these control means being entirely contained in the hatchway panels and supplied with electric current in lieu of the now conventional hydraulic systems. In fact, this device is remarkable notably in that the aforesaid servo-motor means of each panel carrying same consist of at least one driving and reduction gearing unit or the like, preferably of the electromotor type and coupled through a driving transmission to the driving gear member of said gear-type hinge means, the complete mechanism being incorporated in said panel together with the electrical control system.

The arrangement broadly set forth hereinabove is characterized by the following advantages:

(1) Maximum constructional simplicity of all control mechanisms which are enclosed within the structure of the corresponding hatchway panels and require only an electrical connector supplied by the shipyard;

(2) Maximum safety resulting from a positive-type driving action during the opening and closing operations, this action further constituting a guarantee against any failure or faulty operation of the equipment;

(3) Complete elimination of costly hydraulic piping on board ships which originate in general a situation of joint-responsibility between the shipyard and the supplier of the hatchway closing device;

(4) Elimination of any cargo damages caused by leaks inherent to a certain extent to any hydraulic control system for operating hatchway panels;

(5) Minimum maintenance for the hatchway panel operator.

According to another feature characterizing this invention the hinged connection between the endmost edge of the hatchway and the first panel of said row as well as preferably at least one of the aforesaid intermediate lifting hinge connections are equipped with at least one self-balancing system incorporating torsion springs pre-stressed or tightened by gravity, which is of a type already known per se, adapted to exert an auxiliary torque tending to assist the joint-lifting movement in order to relieve the aforesaid servo-motor means, and comprising at least one torsion spring substantially aligned with the hinge axis and having its ends fitted in corresponding sockets or like supports solid respectively with the two panel structures interconnected by said hinge connection.

Other features and advantages of this invention will appear as the following description proceeds with reference to the accompanying drawings illustrating diagrammatically by way of example typical forms of embodiment and applications of this invention in the case of hatchway panels, it being understood that the invention is also applicable to other folding-panel structures as well. In the drawings:

FIGURE 1 is a diagrammatic side elevational view showing a hatchway panel construction comprising a plurality of hingedly interconnected panel sections adapted to be folded in an accordion-like fashion in a vertical stowing position;

FIGURE 2 is a plan view from above of the structure shown in FIGURE 1;

FIGURE 3 is an axial cross-section, on a larger scale with parts broken away, taken upon the line III—III of FIGURE 2;

FIGURE 4 is a fragmentary plan view from above with parts broken away of the device shown in the preceding figure;

FIGURE 5 is a fragmentary side elevational view, taken from the left-hand side, of the device illustrated in FIGURE 3;

FIGURE 6 is a fragmentary side elevational view, taken from the right-hand side, of the device illustrated in FIGURE 3;

FIGURE 7 is a fragmentary plan view from above with parts broken away and other parts in section showing an intermediate liftable hinge connection between two adjacent panel sections;

FIGURE 8 is a section taken upon the line VIII—VIII of FIGURE 7;

FIGURE 9 is a fragmentary sectional view taken on a larger scale upon the line IX—IX of FIGURE 2, showing an intermediate hinge connection between two panel sections having rolling adjacent ends;

FIGURE 10 is a fragmentary plan view from above with parts broken away of the device illustrated in the preceding figure;

FIGURE 11 is a fragmentary section taken upon the line XI—XI of FIGURE 9;

FIGURE 12 is a fragmentary plan view from above showing a modified embodiment of the structure illustrated in FIGURES 3 to 6, wherein the energy accumulator device is detachable and separate from the hinge connections proper;

FIGURE 13 is a diagram illustrating the variation in the torque as a function of the torsion bar dimensions and polar moment of inertia;

FIGURE 14 illustrates in half-view from above a hatchway closed by means of the panel system of this invention;

FIGURE 15 is a side elevational view of the hatchway of FIGURE 14, shown in the fully open position of the panels;

FIGURE 16 is a section taken upon the broken line XVI—XVI of FIGURE 14;

FIGURE 17 is a fragmentary plan view from above showing the mechanism for controlling an intermediate lifting hinge connection between a pair of adjacent panels, the inspection lid being removed to show the interior;

FIGURE 18 is a section taken upon the broken line XVIII—XVIII of FIGURE 17;

FIGURE 19 is another section taken upon the line XIX—XIX of FIGURE 17;

FIGURE 20 is a section taken upon the line XX—XX of FIGURE 14, showing the emergency driving system;

FIGURE 21 illustrates in plan view from above a main hinge connection with a self-balancing torsion spring between the first panel and the end edge of the hatchway;

FIGURE 22 illustrates the preceding hinge system in front view, as seen from the longitudinal end of the hatchway;

FIGURE 23 is an end view showing the right-hand side of the device of the preceding figure;

FIGURE 24 is a longitudinal section showing the self-balancing system, the section being taken on the pivot axis along the line XXIV—XXIV of FIGURE 21 or 25;

FIGURE 25 is a cross section taken upon the line XXV—XXV of FIGURE 22;

FIGURE 26 illustrates in longitudinal or axial section a panel hinge and the torsion spring system associated therewith, the springs being shown in their pre-stressed condition with a torsion of about 90 degrees corresponding to the closed panel position;

FIGURE 27 is a similar external view with parts broken away of the same assembly at the end of a panel showing a specific configuration of the rods constituting the torsion springs;

FIGURE 28 is a cross-section taken upon the line XXVIII—XXVIII of FIGURE 27 to show the arrangement of the spring system.

Referring first to the form of embodiment illustrated in FIGURES 1 and 2 of the drawings, concerning more particularly a hatchway closing panel assembly comprising a plurality of panel sections for a ship's hold, this panel assembly 1 consists of a plurality of panel sections of which only four, designated by the reference numerals 2, 3, 4 and 5 respectively, are illustrated, it being understood that this number is given by way of example only since a single hatchway panel assembly 1 may comprise either a single panel element such as 2 or preferably an even number of such panel elements or sections. These successive panel sections, of which the row constitutes a complete folding panel structure, are adapted to be folded against each other as a portfolio or accordion-wise to a vertical stowing position or upright open-hatchway position at one end of the hatchway aperture and for this purpose said panel sections are hingedly interconnected on the one hand at their intermediate joints such as 6 between adjacent panel sections such as 2 and 3, or 4 and 5, these joints rising during the movement to the open position, and on the other hand at their intermediate joints such as 7 between adjacent panel sections such as 3 and 4 which are provided at or near their adjacent ends with loose wheels or rollers such as 8 adapted to roll on tracks or runways 9 formed along the hatchway coamings or ledges for permanently supporting said panel sections. The endmost panel section 2 is connected at its end opposite to the adjacent intermediate panel section 3 through hinge means 10 having a substantially horizontal hinge axis to the vicinity of the endmost edge 11 of the hatchway.

FIGURE 1 illustrates the hatchway panel folding structure in a position intermediate the spread or unfolded horizontal closed position and the vertical folded open position. The movement of the panel sections to and from these end positions may be controlled for instance by operating each intermediate hinge means such as 6, by associating each of them with control means already known per se, such as gearings 12 connected to the hinge plates and driven from a servo-motor 13 for instance through a chain drive 14.

FIGURES 3, 4, 5 and 6 illustrate a first form of embodiment of this invention which is applicable notably to the hinge means 10 connecting the endmost panel section 2 to the fixed structure 11 of the hatchway edge. This hinge means comprises two angularly movable arms 15, 16 solid with the end portion of panel section 2 and extending substantially at right angles to the substantially horizontal axis of rotation of the hinge means. The movable arm 15 is rigidly secured to one end of a hollow shaft or like member 17 constituting a tubular torsion bar rotatably fitting in a pair of fixed bearings 18, 19 preferably adjacent respectively to the two shaft ends and supported by brackets or like means 20, 21 rigid with the fixed structure 11 of the hatchway end. These bearings may be for example of the split or like type comprising each a cap or like element 22 secured on the bearing case by means of bolts 23. The rotary mounting of shaft 17 in these bearings 18, 19 may advantageously be obtained by resorting to shouldered sockets 24 acting as plain bearings made of adequate fibre, Babbit metal or other suitable antifriction material. The end of shaft 17 which is opposite to the movable arm 15 is rigid with a transverse member constituting a stop arm or the like 25 of which the movement in one direction of rotation is limited by its engagement with a fixed stop or like member 26 carried for example by the bearing support or bracket 21.

Similarly, the pivot arm 16 is rigidly secured to the end of a hollow or solid shaft 27 having a circular or any other suitable cross-sectional shape, which is rotatably mounted within the tubular shaft 17, preferably coaxially thereto, by means of split bearings, bushings or the like constituting bearings 28 interposed between the inner and outer shafts and made of any suitable anti-friction material such as fibre, Babbit metal or the like. The end of shaft 27 which is opposite to the pivot arm 16 is also provided with a stop-arm forming transverse element 29 of which rotary movement in one direction is limited by its engagement with a fixed stop member 30 for example solid with the relevant bearing bracket 20.

The assembly of two concentric shafts 17, 27 will thus constitute the pivot pin of the hinge means interconnecting the panel section 2 and the fixed structure 11 of the hatchway; besides, the fixed stop members 26, 30 are so disposed with respect to the stop arms 25 and 29 that they permit the free rotation of panel section 2 in their opening direction, i.e. when it is folded upwards, but beyond a predetermined position of the panel section 2 during its rotation in the closing direction, i.e. when it is folded downwards, the stop arms 25 and 29 engage respectively and preferably simultaneously the stop members 26 and 30 thus causing, due to their antagonistic bearing reactions, a simultaneous predetermined torsion of shafts 17 and 27, so that these shafts 17 and 27 will store up a certain amount of potential energy which will be available and restituted during the initial part of the opening movement of panel section 2.

FIGURES 7 and 8 illustrate a specific form of embodiment of this invention which is applicable notably to an intermediate hinge means for a liftable joint such as 6 provided between a pair of panel sections such as 2 and 3 or 4 and 5. The two adjacent panel sections, for instance 2 and 3, are interconnected by two pairs of pivot arms 31, 32 and 31', 32', respectively the arms 31 and 31' being rigid with panel section 3, whereas the arms 32 and 32' are rigid with panel section 2. The two pivot arms of each pair are assembled on a common hollow shaft 33 constituting a tubular torsion bar rotatably mounted in the fashion of a pivot pin in axially aligned orifices formed at the free ends of said pivot arms, preferably through the medium of bushings or anti-friction bearings such as 34. The tubular shaft 33 has its two ends rotatably solid respectively with transverse stop arms 35 and 36 adapted to contact stop-forming structural elements such as 37, 38 solid respectively with panel sections 2 and 3. A hollow or solid shaft 39 consisting for example of a round-sectioned bar or the like is rotatably mounted within the shaft 33, preferably coaxially thereto, by means of anti-friction bearings or like centering devices 40. This shaft 39 has its end adjacent to the stop arm 35 solid with a transverse stop arm 41 or the like adapted to contact the structural element 38 solid with panel section 3, and its opposite end solid with another transverse arm 42 adapted to contact the structural element 37 solid with panel section 2.

The relative movement of rotation of panel sections 2 and 3 is controlled by a servo-motor 13 equipped if desired with a reduction gearing (not shown) driving through a roller-chain transmission 14 (a fourfold chain in this example) and corresponding chain sprockets 43, a rotary shaft 44 carrying said chain sprockets and which is rotatably mounted in suitable bearings 45 rigid with the panel section 2. This shaft 44 carries at least and preferably two pinions 46 (for evenly or symmetrically distributing the stress) meshing respectively with corresponding toothed sectors 47 rigidly secured on panel section 3, for example by means of brackets such as 48, the concentric shafts 33 and 39 extending freely through suitable orifices 49 formed in these brackets. The two identical toothed sectors 47 are substantially coaxial and the axis of the common cylindrical surface in which their pitch circles lie is substantially coincident with the common axis of rotation of the hinge means, which is the common axis of shafts 33 and 39.

Referring now to FIGURE 8 is which the panel sections 2 and 3 are shown unwrapped to a flat or spread position corresponding to the closed panel position, it will be clearly apparent that when pinions 46 rotate in the counterclockwise direction the toothed sectors 47 are driven in the clockwise direction, and that the combination of these two relative movements will raise the joint 6 and the two adjacent panel sections 2, 3 which are thus folded and moved toward each other. The operation of the torsion bar system 33, 39 is similar to that of the first form of embodiment described hereinabove, except however that in this case the torsion bars 33 and 39 do not become activated until their respective stop arms 35, 41 and 36 and 42 engage the solid structural elements 37, 38 of the respective panel sections 2, 3. Thus, these torsion bars 33 and 39 are connected unilaterally and possibly temporarily with the relevant panel sections 2 and 3, whilst in the preceding case (FIGS. 1–6) the corresponding stop arms 25 and 29 were rigidly connected to the two structures 2 and 11 respectively to be assembled by hinge means.

FIGURES 9, 10 and 11 of the drawings illustrate a specific form of embodiment of this invention which is applicable to the intermediate hinge means 7 between the rolling ends of two panel sections such as 3 and 4. Thus, for instance, the panel section 4 comprises at its end two support-forming arms such as 50, in the form of brackets or like members so spaced as to be preferably adjacent to the side edges of the panel section concerned. These two arms 50 constitute with their ends substantially coaxial rotation bearings for example of the type having a detachable cap 51 secured by screw or bolts 52, in which bearing a hollow shaft 54 constituting a tubular torsion bar or the like is rotatably mounted by means of anti-friction bushings or like bearings 53. Rotatably mounted inside the shaft 54 is a hollow or solid shaft, for example a round-sectioned shaft 55, by means of anti-friction bearings or like members acting as centering means 56 interposed between shafts 54 and 55. The inner shaft 55 extending completely through the hollow shaft 54 projects from either end thereof and these projections constitute a pair of trunnions or like members 57 carrying loose wheels 58, 59 adapted to roll on a longitudinal runway or track 60 rigid with hatchway coaming or like fixed edge structure 61 of the hatchway. Overlying each runway 60 and parallel thereto is a longitudinal fixed retaining ledge 62, the wheels 58, 59 being disposed between the runway 60 and retaining ledge 62 in order to prevent the wheels from rising off the runway 60 during the operation of the panel section carrying said wheels.

One end of the hollow shaft 54 is rigid with an abutment-forming or like cross shaft 63 adapted to contact one portion 64 acting as stop means or the like which is rigid with the panel section 4. This stop member 64 while shown rigidly attached in any suitable way to be made preferably adjustable to permit the control of the angular amplitude of the permissible torsion of shaft 54 with a view to keep the quantities of energy stored by shafts 54 and 55 respectively to substantially equal values.

The opposite end of shaft 54 is also solid with a cross shaft 65 for example through the medium of an intermediate member having an offset portion 66 for facilitating the assembling, the central shaft 55 extending freely through said arm 65 for the same reason. This arm 65 carries laterally on its free end a roller 67 adapted to roll likewise on the corresponding runway or track 60. The inner shaft 55 is also rigidly assembled, at its end adjacent to said arm 65, with a transverse stop arm or like member 68 adapted to contact an abutment-forming portion 69 rigid with panel section 4 and adapted to limit the movement of said stop arm 68 in one direction. At its opposite end the inner shaft 55 is rigid with a cross arm 70 carrying laterally at its free end a roller 71 adapted to roll on the corresponding runway 60.

The panel section 3 is assembled with the adjacent panel section 4 for example by means of a pair of parallel coupling or traction links 72, the tubular shaft 54 and the concentric inner shaft 55 extending freely through the ends of these links. These links form a translation means for the rolling ends of the panel sections.

In this example the torsion bars 54 and 55 are stressed as a consequence of the antagonistic bearing reactions exerted on the one hand by the runways 60 against the rollers 67 and 71, and on the other hand by the stop members 64 and 69 on the stop arms 63 and 65.

FIGURE 12 illustrates a modified form of embodiment of this invention which is applicable for example to the hinge means 10 between the endmost panel section 2 and the fixed structure 11 on the end edge of the hatchway. Whereas in the preceding forms of embodiment the torsion bar system proper acted as a pivot pin, in this alternate embodiment it constitutes a readily detachable assembly separate from the hinge means proper. In this example the hinge means connecting the panel section 2 to the fixed structure 11 are for instance of the spaced leg and tenon type, the panel section 2 carrying for example one pair of spaced legs such as 73 on which are pivotally mounted by means of a pivot pin or like member 74 a pair of tenon or like element 75 rigid with the fixed structure 11 of the hatchway edge structure and extending between respective pairs of legs 73. The aforesaid pivot pins 74 are substantially coaxial. The energy accumulator device consists in this case of a tubular torsion bar 76 having its two ends rigidly attached to a pair of transverse stop arms or like members such as 77 and 77' adapted, according to the opposite directions of rotation, to contact stop-forming members or portions 78, 78' rigid respectively with the panel section 2 and fixed structure 11. The tubular torsion bar 76 receives preferably coaxially therein a solid or tubular torsion bar 79 rotatably mounted within the tubular torsion bar 76 for example by means of anti-friction bushings or like bearings 80 interposed between the two bars. The inner bar 79 is longer than the outer bar 76 so that its ends project therefrom and are rigid respectively with a hollow endpiece or like member 81, 81' constituting a coaxial sleeve or the like, these endpieces or like member 81, 81' being rotatably fitted on the relevant trunnion-forming projecting ends of pivot pins 74, so that the concentric bars 76, 79 are aligned substantially coaxially with the axis of rotation of the aforesaid leg and tenon hinge connections.

The endpieces 81, 81' are rigid respectively with transverse stop arms 82, 82' extending radially in opposite directions and adapted to contact stop-forming or like portions 83, 83' solid respectively with the hatchway frame or coaming structure 11 and with the panel section 2. One of these stop members, for instance stop member 83' carried by panel section 2, is preferably adjustable in any suitable way to different fixed positions with a view to ensure an equal distribution of the energy stored by torsion within the two bars 76 and 79.

The bar torsion is also produced in this case by the antagonistic bearing reactions exerted respectively by the stop members solid with panel section 2 and fixes structure 11 against the transverse arms solid respectively with the tubular bar 76 and inner bar 79. The advantage resulting from this specific form of embodiment is that it can be used independently as an auxiliary source of stored energy, not only as an integral component element of the panel section hinge means, as in the preceding forms of embodiment. Moreover, in case of failure or breakage of one of the torsion bars in actual service, for example as a consequence of overload or excessive strain, or of a flaw in the making, in the material or for any other cause, the device may be replaced very simply and rapidly. The emergency operation of the hatchway panels is also possible by means of the conventional control means in the absence of the torsion bar device, for the panel sections remain mutually interconnected by the hinge means which are separate from the energy storing device.

FIGURE 13 is a diagram illustrating schematically the variation in the motor or resistance torque produced by the torsion bars as a function of their dimensions (diameter and length) and of their necessary polar moment of inertia. The curve illustrating the relationship between the torque and the bar length corresponds to a 90-degree amplitude of the useful torsion angle. These curves are given by way of example only and should not be construed as limiting the invention, inasmuch as they apply to hot-rolled steel bars having a 6,867-bar (70 kg./sq. mm.) yield point, intended for operating under a maximum permissible torsion stress of about 6,180-bars (63 kg./sq. mm.).

In the form of embodiment illustrated in FIGURE 14 the device is applied to a hatchway designated by the reference numeral 101 and formed in the deck 102 of a ship; only one longitudinal half of the hatchway is shown to simplify the drawing, the other half being substantially symmetric in relation to this first half. The closing device according to this invention consists of a row of say four successive panels 103, 104, 105, 106 of the flat-deck type, i.e. disposed level with the deck 102 and adapted to be stowed at one end of the hatchway. Of course these panels are adapted to seal the deck against weather conditions, according as the deck is a weather deck or not, and on the other hand these panels could be stowed with a disposal differing from the one illustrated by way of example. Moreover, the number of panels, which is at least two, may exceed four and the panels may be disposed in at least two opposite rows, in longitudinal alignment, with the endmost panels hingedly connected by their opposite ends to the hatchway end edge, or the panel arrangement may comprise parallel rows of panels, or a combination of both arrangements.

In the case illustrated the four hatchway panels are adapted to be folded in zigzag or in an accordion-like manner towards one end edge 107 of the hatchway and to this end they are hingedly interconnected with the endmost or so-called first panel 103 hingedly connected to the edge 107 of the hatchway. In the form of embodiment illustrated the four panels are divided into two separate pairs of panels designated by the reference numerals 103, 104 and 105, 106 respectively. The intermediate lifting hinged connection between the adjacent edges of two panels 103, 104 or 105, 106 of each separate pair is formed on the one hand by at least two passive or auxiliary hinges 108 disposed preferably near the side ends of the panels and on the other hand by at least one operative or active or driven hinge 110 disposed preferably centrally of the panel.

The adjacent panels 104, 105 of the two adjacent pairs of panels are interconnected by at least two coupling links 111 having their ends pivotally mounted on the panels 104, 105 and constituting a transport or hauling connection.

Except for the first panel 103 which is hingedly connected to the end edge 107 of the hatchway, preferably by means of at least two simple hinges 112 disposed preferably and respectively near the side edges, all the other panels are provided near their ends opposite to said lifting intermediate hinges with at least one pair of lateral bearing and displacement members 113 such as wheels, rollers, shoes, skids or the like, whereby these panels are supported and capable of moving along lateral runways or tracks 114 provided along the two opposite sides of the hatchway and consisting as a rule of the hatchway coaming plates or ledges (see FIGURE 15). To facilitate the keeping of the panel assembly in its vertical stowing position the various panels are advantageously provided on their lower or inner face with stop means such as 115 adapted to contact corresponding stop or abutment means carried by the adjacent panel of a same separate pair of panels, in order to maintain a constant relative spcing or parallelism between the panels in their vertical folded position.

One of the panels 103 or 105 of each separate pair of panels is equipped with at least one control and driving mechanism 116 mounted in each panel 103 and 105 of which it is an integral part, this mechanism being adapted to actuate the active or driven hinge 110. Each control mechanism 116 consists of a reduction gearing comprising a reversible electromotor 117 coupled to a speed reducing gearing 118 providing preferably a high reduction ratio. This coupling may be either direct or through any suitable drive or transmission mechanism such as belt or chain drive; in the example illustrated this transmission comprises a driving sprocket 119 mounted on the output stub shaft of motor 117 and connected through an endless chain 120 to the input sprocket 121 of said reduction gearing 118 (see FIGURES 16, 17 and 18).

The reduction gearing 118 drives in turn the hinge gears 110 through a low-rotational speed and relatively high torque gear casing 122, a suitable transmission such as a chain drive 123 connecting the output sprocket 124 of the reduction gearing to this gear casing 122.

The electromotor 117 and reduction gearing 118 are advantageously mounted on a base plate constituting a common support frame structure 125 which is detachably mounted in the panel structure 103 or 105. All the rotary shafts and pins of the driving and control mechanism described hereinabove are preferably substantially parallel. The position of the electromotor 117 with respect to its line of centers with the reduction gearing 118 is advantageously adjustable by means of mechanical adjusters such as screw adjusters 126 constituting adjustable abutments for the motor on its support carrying these adjusters. The position of the support frame structure 125 with respect to the gear casing 122 is also adjustable by means of other screw adjusters 127 constituting adjustable abutment members rigid with the panel 103 or 105 (see FIGURE 18). The support frame structure 125 may also constitute a kind of self contained panel adapted to close from underneath the space containing the control and driving unit in the hatchway panel, this frame structure comprising to this end cross members 125a adapted to be bolted at 125b on the hatchway panel structure 103a (see FIGURE 19).

The gear casing 122 constituting the driving transmission between the reduction gearing 118 and the gear hinge 110 comprises a primary rotary shaft 128 carrying on the one hand a sprocket 129 driven from the reduction gearing by means of the aforesaid chain 123 and on the other hand at least one pinion 130 meshing with a companion or conjugate pinion 131 carried by a rotary lay shaft 132 of the gear casing 122. This pinion 131 meshes in turn with a toothed wheel 133 rigid with a secondary shaft 134 of this gear casing 122 which carries one and preferably at least two pinions 135, 135′ constituting the driving toothed member of the gear hinge 110, these pinions meshing with the two corresponding toothed sectors 136, 136′ respectively which are solid with the adjacent panel 104 or 106 and substantially coaxial to the axis of rotation of the hinge pivot pin 137 of the aforesaid gear hinge 110.

The hinge connection proper of this gear hinge assembly consist for example on the one hand of the two parallel arms or side plates of a U-shaped yoke or strap 138 constituting a supporting bracket rigid with the panel 103 or 105 and forming for example an integral part of the gear casing 122, and on the other hand of a hinge strap 139 rigid with the adjacent panel 104 or 106, which strap also constitutes a tenon-like supporting bracket, the two straps 138 and 139 being hingedly interconnected by the aforesaid hinge pin 137. The vertical transverse plane of symmetry of the hinged assembly is preferably coincident with the vertical longitudinal plane of symmetry of the panels.

As easy access to the control and driving mechanism 116 can be had through a relatively large, substantially rectangular aperture 140 formed in the upper or outer structural plate of the hatchway panel which can be closed by an easily detachable lid or inspection door.

For safety reasons, the reduction gearing 118 is advantageously equipped with a torque limiter 141 mounted preferably on the output shaft 142 of the reduction gearing (see FIGURE 17).

Emergency means are also provided for driving the control mechanism 116 in case of accidental stoppage, breakdown or failure in the supply of electric current to the motor. These means consist preferably of a detachable crank-handle, a pneumatic wrench or the like, adapted to fit on the projecting end 143 of the motor shaft which is opposite to the stub shaft carrying the driving sprocket 119. To this end, this shaft end 143 is made accessible from a lateral side of the panel by means of a rotary shaft extension 144 mounted in a suitable bearing 145 carried by the panel structure 103 or 105 and coupled to the shaft end 143 of motor 117 by means of a universal or Hooke joint 146 or the like. The free end 147 of shaft extension 144 is formed with a suitable portion, for example a square-sectioned portion engageable by the aforesaid crank-handle or wrench through an orifice 147a of the panel wall (see FIGURE 20).

All the electric control equipments and circuits associated with each electro-motor 117 are also mounted integrally within the relevant panel structure 103 or 105, which comprises preferably on the top and on the side of said panel so as to be easily accessible an electrical socket, plug-in connector or outlet 148 or the like, preferably of the shielded type connected to the electromotor control equipment and adapted to be connected by means of a plug-in connector cap 149a or the like carried by the free end of a flexible electric cable 149 leading from a portable push-button switch remote-control casing 150 (see FIGURE 14).

In order to reduce the torque value necessary for folding each separate pair of panels and thus reduce the magnitude or dimensions of the component elements of the driving mechanism (gear casing, motor, reduction gearing, etc.) the main hinge connection 112 between the first or endmost panel 103 and the end edge 107 of the hatchway 102 which constitutes the headledge, as well as preferably at least the hinge connections provided at the intermediate lifting panel joint of each separate pair of panels outside the first pair, are equipped with independent torsion-spring self-balancing means of the type known per se and adapted to assist and relieve the control mechanisms 116.

To this end, the hinged connection, for example the main hinged connection 112 between the panel 103 and the end edge 107 of hatchway 102 comprises advantageously at least two torsion springs 151, 151′ preferably identical which are disposed symmetrically in relation to the longitudinal axis of the hatchway, respectively, each spring being mounted between two sockets or like supports 152, 152′ solid respectively with the hatchway edge 107 and the panel 103. The socket support 152′ may form an integral part of the adjacent hinge connection 112. On each socket support 152 solid with the hatchway edge 107 the socket orifice may be closed by means of a detachable end cap or lid 153 (see FIGURES 21, 22, 24).

Each hinged connection proper 112 aforesaid is comprised for example of a hinge strap 154 solid with the endmost panel 103 and of a pivot tenon 155 solid with the structural member of the hatchway edge 107. The strap and tenon 154, 155 are pivotally connected by a pivot pin 156 extending through coaxial aligned orifices formed therein, tenon 155 being advantageously provided with an antifriction bearing or bushing 157 force fitted in the tenon bore (see FIGURES 22, 23 and 24). The strap 154 comprises in addition a socket 158 similar to the socket 152a of support 152 and substantially coaxial thereto and also with respect to the hinge axis so as to constitute the socket support 152′ for the torsion spring.

Each torsion spring 151 or 151′ consists of a plurality of flat strips or blades 159 which are seven in number in this example and substantially identical with one another; these strips or blades 159 are assembled along their major faces in order to constitute a bundle of substantially rectangular and preferably square cross section obtained by properly selecting the blade thickness (see FIGURE 25). This bundle is fitted by its opposite ends in sockets 152a and 158 provided to this end with corresponding square or rectangular recesses obtained for instance by means of four wedging blocks or like elements 160 disposed symmetricaly in opposition by pairs and mounted within said sockets, as shown notably in FIGURE 24.

Each torsion spring 151 or 151′ is advantageously mounted within a tubular or like protection sheath or casing 161 interconnecting the sockets 152a and 158 aforesaid and mounted if desired in a water-tight manner in case the hinge means were exposed to weather conditions. This sheath or casing is adapted to protect the torsion spring assembly against any damage from external action to prevent the ingress of foreign substances and avoid the dispersion of steel fragments in case of breakage of one or more spring blades.

According to a modified form of embodiment the pivot pin 156 assembling the elements of the aforesaid hinge connection 112 may be coaxially solid with the adjacent end portion of the torsion spring 151 or 151' (see FIGURE 24).

Each torsion spring 151 or 151' is so mounted as to be free of any torsional torque when the hatchway panels are stowed in their open position. When the panels are being moved to their closed position each torsion spring 151 or 151' is twisted through an angle of about 90 degrees by the weight of the panels associated therewith. The torque thus accumulated in the spring is subsequently available for assisting the control mechanism during the next panel opening operation.

The lifting intermediate hinged connection associated with the pair of panels 105 and 106 is also advantageously equipped with a self-balancing system comprising preferably at least two substantially identical torsion springs 162, 162' disposed symmetrically in relation to the longitudinal axis of the hatchway. To this end, they are mounted between the gear hinge 110, on either side thereof, and each one of the auxiliary hinge means 108. These torsion springs 162 or 162' are similar to the springs 151, 151' of the preceding form of embodiment and are protected in a similar manner, but they are of a lighter design and so arranged as to be capable of operating with an angular amplitude of about 180°. Each spring 162, 162' has its ends fitted in two sockets respectively, these sockets being solid respectively with the adjacent hatchway panels, one of them being preferably solid with the strap of the adjacent hinge means. Thus, for example, in the form of embodiment illustrated in FIGURE 14, each spring 162 or 162' is fitted by one end in a socket 163 solid with the strap 138 of the central hinge system 110, said strap being secured on the panel 105 and in fitting socket 164 rigid with the strap of the auxiliary hinge means 108 secured on panel 106.

Each torsion spring 162 or 162' is aligned coaxially with the axis of rotation of the corresponding hinge means 108 and 110 and may also have its ends solid with the adjacent hinge pins.

This device operates as follows, during the opening movement from the closed flat spread position of the panels to the open folded stowing position.

The operator connects the electrical control casing 150 by plugging in the connecting cap 149a of the electric cable 149 in the outlet or socket 148 of the endmost panel 103. Then the operator controls the folding of the first pair of panels 103, 104. During its folding movement to its vertical position panel 104 carries along through the medium of the coupling links 111 the next pair of panels 105, 106 which remain in their spread horizontal position until the first panels 103, 104 are completely folded to the vertical. Then the panels 105, 106 of the next pair are folded against the aforesaid panels 103, 104. FIGURE 15 shows in solid lines the panels in their folded or stowing position, and in chain-dotted lines the spread panels.

The series of operations or manoeuvres for closing the hatchway, i.e. for moving the panels from the folded vertical position to the unfolded horizontal position takes place in the reverse order with respect to the panel opening operations.

It will be readily understood by anybody conversant with the art that the power rating of the control mechanisms 116 mounted on the various pairs of panels such as 105, 106 following the first pair 103, 104 is inferior to that of the mechanism 116 controlling this first pair, since this last-named mechanism must be capable of carrying along all the other panels. For the same reason the torsion-spring self-balancing systems equipping the lifting intermediate hinge connections associated with panels 105, 106 and the next pairs of panels if any, have likewise a lower power rating than that of the similar systems associated with the main hinged connection between the first panel 103 and the edge 107 of the hatchway.

The form of embodiment shown and described herein relates to an even number of panels. According to a modified embodiment the row of panels may comprise any number of panels, for example an odd number of panels, which results from the addition, to the aforesaid row comprising an even number of panels, of at least one complementary panel, this complementary panel being preferably pivotally connected to said row and adapted to be either raised to a substantially vertical open position or lowered or folded to a substantially horizontal closed position, and being furthermore equipped with separate means for controlling the lifting and folding movements.

Instead of a torsion spring consisting for example of a bundle of substantially straight and parallel flat bars or contiguous blades contacting one another with their flat or wide faces in order to constitute a blade assembly of substantially rectangular or square cross section, each single or multiple torsion spring associated with each active hinge means of said panel consists of one or a plurality of helical springs, or solid or tubular cylindrical bars or rods.

FIGURES 26 to 28 correspond substantially to FIGURES 24, 22 and 25 respectively and the similar members, parts or elements of the structure are designated herein by the same reference symbols or numerals.

The form of embodiment exemplified in FIGURES 26 to 28 relate more particularly to a hinge device interconnecting the endmost panel 103 and the fixed structure 107 of the end edge of the hatchway or aperture to be covered, but a substantially similar system is applicable to the pivoted connection between two successive adjacent panels.

The aforesaid hinge device designated in general by the reference numeral 112 consists in this case of a relatively movable strap 154 solid with panel 103 and of a tenon 155 rigid with the relatively fixed structure 107. The torsion spring 201 associated with this hinge device is mounted between on the one hand the fastening socket or block 202 laterally solid with the strap 154 and substantially coaxial to the pivot pin or trunnion 156, and, on the other hand, the fastening socket or block 203 substantially coaxial to socket 202 and carried by the support 152 rigid with the structure 107. The spring 201 is surrounded by a protection tube, sheath or housing 161 interconnecting the two sockets 202 and 203.

The torsion spring 201 consists of a group of separate rods or bars, having for example a round and solid cross sectional contour, which are spaced from one another and have their ends fitted in corresponding recesses 204 formed in said supporting blocks 202 and 203. These recesses may consist respectively of cylindrical holes or bores having their axes substantially parallel to the aforesaid pivot pin or trunnion.

The fitting of each rod end portion in the relevant bore may be of the slide-fit type obtained by using plain contact surfaces.

According to an advantageous modified form of embodiment the assembling by pair of the two mutually contacting surfaces of a rod end and of the corresponding bore may take place by the meshing engagement of conjugate splines preventing any relative movement of rotation, the ends of each rod and their corresponding bores being formed to this end with longitudinal splines.

This assembly method permits of increasing the energy storing capacity of the spring since each rod, in addition to a rotary flexion about the common pivot pin, will undergo a torsion about its inherent axis (see FIGURE 26).

The rods 201 may be so disposed that the axes of at least some of them be preferably regularly spaced, parallel to the generatrices of at least one circular cylindrical geometrical surface substantially coaxial to the panel hinge 112. FIGURES 27 and 28 illustrate such a configuration consisting for example of eight rods designated by the reference letters A, B, C, D, E, F, G, H respectively, of which the cross-sections taken upon a common plane are centered on a common circumference coaxial to said hinge means and on which the centers of said sections are preferably disposed at spaced intervals. FIGURE 27 shows more particularly the relative positions occupied by the two opposite end portions respectively of each rod in the closed configuration of panel 103 (in a substantially horizontal position) in which the torsion spring 201 is twisted through a global angle of about 90°.

It is stated hereinabove that each gearing controlling the movement of a hinged connection between two successive adjacent panels was driven from an electromotor. It is obvious that any other known type of driving motor adapted to operate in both directions, for example compressed-air or hydraulic motors, may be substituted for an electromotor, if desired.

Of course the invention should not be construed as being limited by the form of embodiment shown and described herein which is given by way of example only.

What we claim is:

1. In combination with a hinge system pivotally interconnecting two hatch cover panel elements at least one of which is angularly movable with respect to the other between two end positions thereof, power-operated means supported by the panel elements for effecting pivotal movement of said elements in two directions, a resiliently loadable device for assisting pivotal movement of at least said one element in at least one direction during at least one portion of its relative rotation, comprising at least one torsion spring assembly consisting of at least two substantially straight torsion bars adapted to jointly store energy during at least one portion of said pivotal movement in the opposite direction, at least one of which is tubular whereas the other is rotatably mounted and extends coaxially within said outer tubular bar, both bars having their opposite ends each one integral with a transverse arm-like member which are connected to said elements respectively at least in a relative end position thereof and at least during twisting of said bars.

2. A device according to claim 1 wherein said torsion spring assembly is detachably secured to said elements and at least one of said arm-like members of each one of said bars is adapted to engage one of said elements at least temporarily through unilateral contact therewith.

3. A device according to claim 2 comprising stop means secured to one of said elements and angularly adjustable relative thereto for engagement with one of said arm-like members.

4. A device according to claim 1, wherein at least said outer tubular torsion bar forms the hollow pivot pin or shaft of said hinge system.

5. A device according to claim 1, wherein said inner bar carries on the one hand coaxially thereto a loose wheel at either end and, on the other hand, a loose wheel mounted on the end of one of its two arm-like members, whereas said outer tubular bar carries a loose wheel at the end of one of its two arm-like members, said wheels being adapted to roll on a fixed surface, and the other arm-like members of said bars being connected at least temporarily to at least one of said elements respectively.

6. In a hatch cover construction comprising at least one row of an even number of hingedly interconnected hatch cover panels, the first one of which is pivotally connected to one end edge of a hatch whereby said row may be vertically folded back in zig-zag fashion towards said hatch end edge upon raising some of the intermediate junctions thereof, whereas both panels of each distinct pair of successive panels are positively interconnected at their raisable junction by at least one driving gear coupling associated with a hinge connection, a remote controlled closing device comprising an electromotor driven reduction gear carried by one panel of each one of said pairs of panels and operatively connected through transmission means with said driving gear coupling and an electrical control system provided for said electromotor, said electromotor driven reduction gear, said transmission means and said electrical control system being entirely integrated to said panel.

7. A device according to claim 6, wherein the hinged connection between said hatch end edge and said first panel is fitted with at least one torsion spring assembly twistable by gravity and adapted to assist the lifting movement of said hinged connection and comprising at least one torsion spring substantially aligned with the hinge axis and of which the ends are fitted in corresponding socket supports integral with said first panel and with said end edge respectively.

8. A device according to claim 6, wherein at least one of said intermediate raisable junctions is fitted with at least one torsion spring assembly twistable by gravity and adapted to assist the lifting movement of said hinged connection and comprising at least one torsion spring substantially aligned with the hinge axis and of which the ends are fitted in corresponding socket supports integral respectively with both panels hingedly interconnected at said junction.

9. A device according to claim 6, wherein each reduction gear is removably and adjustably mounted on a common detachable base member secured on the relevant panel to form a detachable self-contained unit.

10. A device according to claim 6, wherein each reduction gear comprises a reversible electromotor operatively connected through a chain drive to a speed reduction gear of high reduction ratio which is connected to said transmission means, which provides a further reduction ratio.

11. A device according to claim 10, wherein each one of said transmission means comprise a gear box adapted to provide a low output speed and a high torque.

12. A device according to claim 6, wherein said transmission means includes a gear box comprising a primary rotary shaft carrying a sprocket driven by means of an endless chain from an output sprocket of said reduction gear and also, at least one pinion meshing with a conjugate pinion carried by a lay shaft, said conjugate pinion meshing in turn with a toothed wheel solid with a secondary shaft carrying two pinions which form the driving toothed members of said driving gear coupling and meshing respectively with two corresponding toothed sectors integral with the adjacent panel.

13. A device according to claim 12, wherein said reduction gear is fitted with a torque limiter.

14. A device according to claim 12 comprising emergency means for operating each one of said driving gear coupling and comprising a detachable crank-handle adapted to fit on the end of the projecting output stub shaft of said electromotor, said stub shaft being provided with a shaft extension by means of a universal joint.

15. A device according to claim 6, wherein an orifice for access to said reduction gear, transmission means and driving gear coupling is provided in each relevant panel fitted therewith, said orifice being adapted to be closed by a detachable inspection lid.

16. A device according to claim 6, wherein at least one of said panels equipped with said reduction gear comprises an electrical connector in the form of a socket connected to the control system of the electromotor, said connector being adapted to be connected to a flexible electric cable leading from a portable remote-control case incorporating a plurality of electric switches.

17. A device according to claim 7, wherein each one of said torsion springs is mounted within a tubular sheath integral with at least one of said socket supports.

18. A device according to claim 7, wherein at least one of the two end fitting socket supports of each torsion spring is fixed to a strap of one hinge connection.

19. A device according to claim 18, wherein each torsion spring is coaxially fixed at at least one of its ends with a trunnion forming the pivot pin assembling said hinge connection.

20. A device according to claim 6, wherein two adjacent panels of two successive pairs of panels are interconnected through at least one coupling link.

21. A device according to claim 7, wherein each torsion spring comprises a plurality of contiguous flat spring blades, substantially straight and parallel, contacting one another with their major faces so as to constitute a bundle of substantially rectangular cross section.

22. A device according to claim 7, wherein each torsion spring consists of at least one plurality of rods.

23. A device according to claim 22, wherein each torsion spring consists of a cluster of rods, spaced from one another, substantially straight and parallel in the unstressed condition, and mounted by their respective ends in separate corresponding orifices formed in bearing means solid respectively with two adjacent panels.

24. A device according to claim 23, wherein the end portions of each rod are fitted respectively in their relevant orifices with a slide fit, their conjugate surfaces which contact said portions and their relevant orifices being plain.

25. A device according to claim 24, wherein the end portions of each rod are fitted respectively in their relevant orifices with a slide fit, their conjugate surfaces which contact said portions and their relevant orifices being splined.

26. A device according to claim 23, wherein the axes of at least some of the said rods are disposed at spaced intervals and parallel to the generatrixes of at least one circular cylindrical surface substantially coaxial to said panel hinge connection.

27. In a hatch cover construction comprising at least one row of an even number of hingedly interconnected hatch cover panels, the first one of which is pivotally connected to one end edge of a hatch whereby said row may be vertically folded back in zig-zag fashion towards said end edge upon raising some of the intermediate junctions thereof, power-actuated driving means at at least one of the intermediate junctions for operating the panels from unfolded to folded condition relative to the hatch and vice versa, torsion spring means adapted to be twisted by weight of the panels in moving to closing position to provide a lifting assist to the panels in movement of the latter to open condition thereby reducing the torque and power requirements of the power actuated driving means, said torsion spring means being located at hinged interconnections other than that at which said power-actuated driving means is located.

28. In a hatch cover construction according to claim 27, wherein said torsion spring means comprise contiguous flat spring blades that are substantially straight and parallel and in contact with one another so as to provide a bundle of substantially rectangular cross-section.

29. In hatch cover construction according to claim 27, hinged connection between adjacent panels, said torsion spring means being substantially aligned with the axis of such hinged connection and comprising contiguous, flat, parallel spring blades in contact with one another and forming a bundle of substantially rectangular section, a socket support for each end of said bundle, one such support being fixed to each of adjacent panels at the hinged connection.

30. In a hatch cover construction comprising at least one row of hingedly interconnected hatch cover panels, a first one of which panels is pivotally connected to an end edge of a hatch whereby said row of panels may be vertically folded back to hatch-opening position in zig-zag fashion towards said hatch end edge upon elevation of intermediate hinged interconnections between adjacent panels, power actuated means for elevating at least one of the intermediate hinged connections and supported by the panels, torsion spring assembly means at the pivotal connection between the first panel and the hatch end edge to assist in lifting movement of the hinged interconnections by said power actuated means, said torsion spring means comprising at least one torsion spring substantially aligned with the axis of the pivotal connection and end supports for each end of said torsion spring, one secured on said first panel and the other secured to said hatch end edge, said torsion spring comprising contiguous, flat, parallel spring blades in contact with one another and forming a bundle of substantially rectangular section.

31. In a hatch cover construction according to claim 30, additional torsion spring means at at least one intermediate hinged connection between adjacent pairs of panels.

32. In a hatch cover construction according to claim 30, additional power actuated means for additionally elevating another of the intermediate hinged connections.

References Cited

UNITED STATES PATENTS

| | | | |
|---|---|---|---|
| 1,392,918 | 10/1921 | Cornell | 160—323 X |
| 1,672,616 | 6/1928 | Lambert | 52—291 |
| 2,567,287 | 9/1951 | Ingram | 16—175 X |
| 2,774,099 | 12/1956 | Thomas | 16—180 |
| 3,022,536 | 2/1962 | Floehr | 16—75 |
| 3,085,622 | 4/1963 | Burgin | 160—191 |
| 3,103,035 | 9/1963 | Magnuson | 16—75 X |
| 3,109,194 | 11/1963 | Hay | 16—75 |
| 3,172,461 | 3/1965 | Hanger | 160—133 |

DAVID J. WILLIAMOWSKY, *Primary Examiner.*

HARRISON R. MOSELEY, PETER M. CAUN,
*Examiners.*